US007419349B2

(12) United States Patent
Goodrich

(10) Patent No.: US 7,419,349 B2
(45) **Date of Patent: *Sep. 2, 2008**

(54) WHEELCHAIR ACCESS SYSTEM WITH STACKING PLATFORM

(75) Inventor: Ronald Goodrich, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/489,344

(22) Filed: Jul. 19, 2006

(65) Prior Publication Data

US 2006/0263183 A1 Nov. 23, 2006

Related U.S. Application Data

(63) Continuation of application No. PCT/US2004/019200, filed on Jun. 15, 2004, which is a continuation-in-part of application No. PCT/US2004/001614, filed on Jan. 20, 2004, and a continuation-in-part of application No. 10/353,544, filed on Jan. 29, 2003, now Pat. No. 6,837,670.

(51) Int. Cl.
*B60P 1/44* (2006.01)

(52) U.S. Cl. .................................. 414/546; 414/921

(58) Field of Classification Search ................. 414/540, 414/546, 921
See application file for complete search history.

(56) References Cited

U.S. PATENT DOCUMENTS 3,651,965 A 3/1972 Simonelli et al.
3,913,759 A * 10/1975 Deacon ...................... 414/546
4,007,844 A 2/1977 Perkins
4,121,695 A 10/1978 Carpenter
4,140,230 A 2/1979 Pearson
4,251,179 A 2/1981 Thorley
4,252,491 A * 2/1981 Hock ......................... 414/540
4,353,436 A 10/1982 Rice et al.
4,408,948 A 10/1983 Robinson
4,479,753 A 10/1984 Thorley
4,534,450 A 8/1985 Savaria
4,664,584 A 5/1987 Braun et al.
4,685,858 A 8/1987 Manning et al.
4,984,955 A 1/1991 McCullough
5,026,244 A 6/1991 Dorn
5,180,275 A 1/1993 Czech et al.
5,261,779 A 11/1993 Goodrich (Continued)

*Primary Examiner*—Charles A Fox
(74) *Attorney, Agent, or Firm*—Michael Best & Friedrich LLP

(57) ABSTRACT

A wheelchair lift system having a stacking platform for use in conjunction with a vehicle. The wheelchair lift platform includes a first portion with an elongated support having fixed and moveable platform sections and a linear actuator powerable for moving between outboard and inboard positions. When stored in an upright, vertical orientation, one section of the platform is stored in a stacking or overlapping fashion behind the other section and stored upright inside the vehicle. Upon deploying the platform to its horizontal orientation, the two sections of the platform form one continuously coplanar lifting platform with the moveable platform section moving relative to the fixed platform section. A linkage system couples the moveable platform section for linear movement with the linear actuator for an orientation with the moveable platform section stowed as being stacked or overlapping with the fixed platform section. The actuator may further employ a pulley with a connector coupled to turn the pulley and a drive to move the platform.

19 Claims, 23 Drawing Sheets

U.S. PATENT DOCUMENTS

| | | | | |
|---|---|---|---|---|
| 5,401,135 | A | 3/1995 | Stoen et al. | |
| 5,445,488 | A | 8/1995 | Saucier et al. | |
| 5,524,952 | A | 6/1996 | Czech et al. | |
| 5,542,811 | A | 8/1996 | Vartanian | |
| 5,564,884 | A | 10/1996 | Farsai | |
| 5,605,431 | A | 2/1997 | Saucier et al. | |
| 5,613,825 | A | 3/1997 | Dorn | |
| 5,628,610 | A | 5/1997 | Stratman et al. | |
| 5,653,568 | A | 8/1997 | Josephs | |
| 5,672,041 | A | 9/1997 | Ringdahl et al. | |
| 5,703,450 | A | 12/1997 | Josephs | |
| 5,751,124 | A | 5/1998 | Josephs | |
| 5,806,632 | A | 9/1998 | Budd et al. | |
| 5,865,593 | A | 2/1999 | Cohn | |
| 5,890,545 | A | 4/1999 | Smith et al. | |
| 5,944,473 | A | 8/1999 | Saucier | |
| 5,960,909 | A | 10/1999 | Horcher et al. | |
| 5,975,830 | A * | 11/1999 | Goodrich et al. | 414/541 |
| 6,053,693 | A | 4/2000 | Ringdahl et al. | |
| 6,065,924 | A | 5/2000 | Budd et al. | |
| 6,086,314 | A | 7/2000 | Savaria | |
| 6,102,648 | A * | 8/2000 | Fretwell et al. | 414/540 |
| 6,203,265 | B1 | 3/2001 | Cohn et al. | |
| 6,203,266 | B1 | 3/2001 | Savaria et al. | |
| 6,238,168 | B1 | 5/2001 | Cohn et al. | |
| 6,238,169 | B1 | 5/2001 | Dupuy et al. | |
| 6,340,280 | B1 | 1/2002 | Mollick | |
| 6,357,992 | B1 | 3/2002 | Ringdahl et al. | |
| 6,379,102 | B1 | 4/2002 | Kameda | |
| 6,398,479 | B1 | 6/2002 | Dupuy et al. | |
| 6,435,804 | B1 | 8/2002 | Hutchins | |
| 6,554,086 | B1 | 4/2003 | Goertzen et al. | |
| 6,837,670 | B2 | 1/2005 | Goodrich | |
| 2006/0233632 | A1 * | 10/2006 | Hayes et al. | 414/546 |

* cited by examiner

FIG. 1
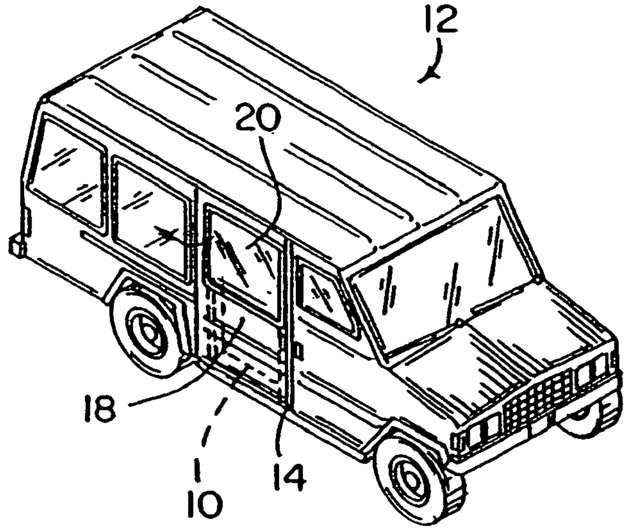
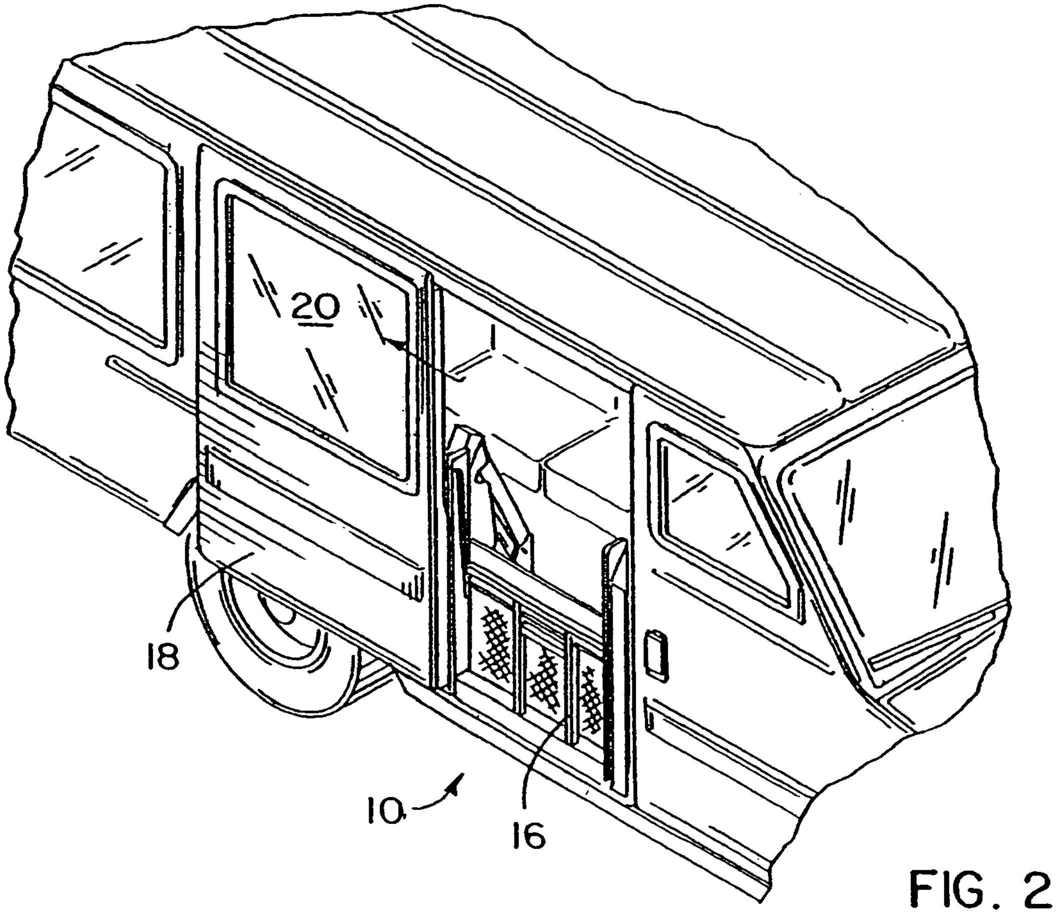
FIG. 2

FIG. 6
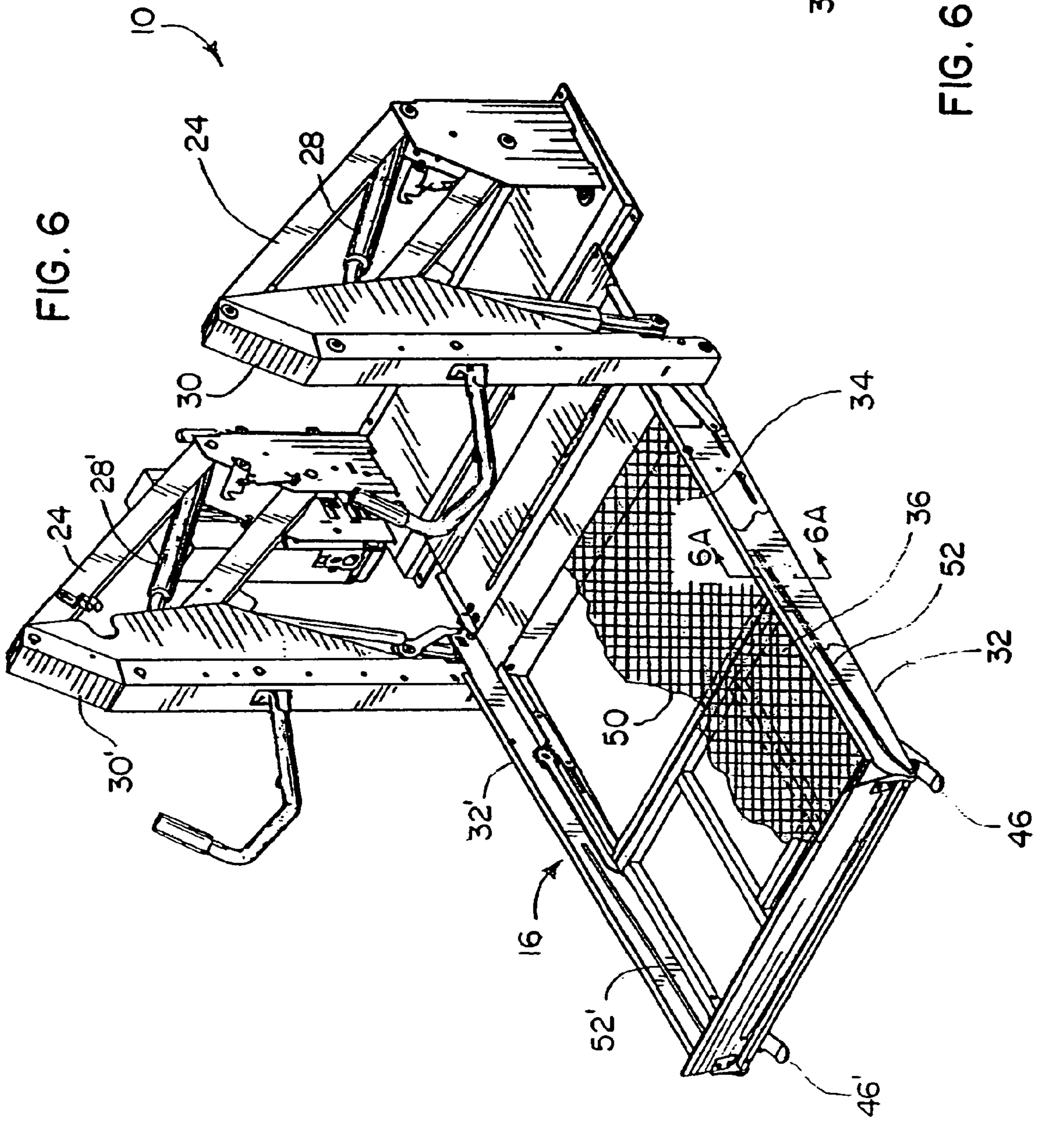
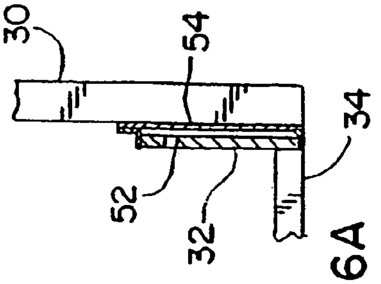
FIG. 6A

WHEELCHAIR ACCESS SYSTEM WITH STACKING PLATFORM

CROSS-REFERENCE TO RELATED APPLICATIONS

This application is a Continuation of International Patent Application No. PCT/US2004/019200, filed Jun. 15, 2004, which claims the benefit of and is a Continuation-In-Part of International Patent Application No. PCT/US2004/001614, filed Jan. 20, 2004 and U.S. patent application Ser. No. 10/353,544, filed Jan. 29, 2003, now U.S. Pat. No. 6,837,670.

BACKGROUND OF THE INVENTION

1. Field of the Invention

The present invention relates generally to the field of mechanical lifts including linear actuator systems, and more particularly to a wheelchair lift platform structure having stacking platform sections capable of being folded and stored in an upright position within a vehicle.

2. Description of the Related Art

Vehicular wheelchair access systems for handicapped persons, such as lifts and ramps, can be mounted on vehicles and made deployable/stowable with respect to the vehicle. Wheelchair users typically move their wheelchair along the lift or ramp platforms in order to transfer from the ground to the vehicle and from the vehicle to the ground using a lift mechanism and platform structure or ramp, which may be operated mechanically, electrically, pneumatically or hydraulically, etc. Known wheelchair lift platform structures include solid rigid panels or floors as platform structures that must be stowed away within the vehicle itself. Accordingly, the wheelchair access system is used in conjunction with and occupies a portion of the floor space of the vehicle and further may obstruct passageways and restrict the amount of available space within the vehicle.

For handicapped persons, mobility is enhanced with the availability of wheelchair access systems that are powered to provide much or all of the movement of the motorized platform structure. This is particularly useful due to the inconvenience of physical activity by the wheelchair passenger. Such lifts typically have pivotal mechanisms for raising and lowering platform structures, see e.g., U.S. Pat. No. 5,261,779 to Goodrich for "Dual Hydraulic, Parallelogram Arm Wheelchair Lift" issued 16 Nov. 1993 and U.S. Pat. No. 6,238,169 to Dupuy, et al. for "Dual Function Inboard Barrier/Bridge Plate Assembly for a Wheelchair Lift" issued 29 May 2001 to applicant's assignee. Each of these discloses dual hydraulic, parallelogram arm wheelchair lift assemblies for use typically in commercial vehicles. The lift assembly has a platform connected to a parallelogram structure. In both of the above assemblies, when the platform of the lift is in a stowed position, the platform essentially blocks the doorway. Moreover, the wheelchair access system being fixed on the floor of the vehicle itself may provide limited space and visibility from and within the vehicle.

Other wheelchair lifts that do not completely block the door when in a stored position have been described, e.g., U.S. Pat. No. 4,664,584 to Braun, et al. for "Rotary Wheelchair Lift" issued 12 May 1987 discloses a rotary hydraulic lift having a vertically-telescoping slide tube and a horizontal wheelchair platform support arm attached to the lower end of the slide tube moving the platform into or out of the vehicle parallel to the slide tube. However, the platform structure and pivotal mechanism employed in rotatable wheelchair lifts require a substantial amount of space.

Further, foldable and multiple section platform assemblies are known to decrease the platform area. Known examples of platform structures employing hinges between inner and outer platform sections such that the outer section pivots and folds against the outer side of the inner section include U.S. Pat. No. 6,379,102 to Kameda for "Wheelchair Lift with Foldable Platform" issued 30 Apr. 2002. A lack of predictability of operation while being folded or unfolded, however, is a substantial disadvantage associated with this type of platform assembly when the platform structure is deployed from its stowed position. For example, in the stowed position the outer platform section, unless properly hooked, can dangle and assume a variety of positions. Rollstops to prevent the wheelchair passenger or operator from interaction with the lift structural componentry have either not been provided or are not effective. Additionally, exposed rigid linkages may come in contact with the operator or passenger. Such linkages, in addition to being unsightly and annoying, may also present a substantial safety hazard to passengers and operators who come into contract with them during the operation of the lift.

To address the growing concern for passengers who are handicapped or otherwise have limited mobility, it would be desirable to provide compact, storable wheelchair access systems that minimize the space they occupy on the floor of the vehicle for storing the lift platform structure. Further, in certain instances it would be desirable for the access system to provide for enhanced access to the door and particularly the door window for unobstructed views from within the vehicle. In view of the foregoing, there remains a need for a wheelchair-lifting platform that can be stored upright and out of the way inside the vehicle when not in use, while occupying a minimum amount of stored space.

SUMMARY OF THE INVENTION

The exemplary embodiments relate to a wheelchair access system facilitating deployment from the floor of a vehicle with limited space for storage within the vehicle. In one described embodiment, the wheelchair access system utilizes a parallelogram lift with a platform structure including at least two platform sections providing an extended platform floor when deployed. The platform sections include a fixed platform section and a moveable platform section, which may be stacked for storage in a stowed orientation with a low vertical profile allowing for an unobstructed view from within the vehicle. Another embodiment provides an extended length folding and stacking platform that fits within a standard vehicle doorway thereby obviating the need for modifications to the vehicle roof or floor.

An actuator is powerable for moving vertical arms of the lift, which thereby pivot the elongated supports and also move the moveable platform section between stowed and deployed orientations. When the platform is not in use, the platform sections transition from the deployed, coplanar position to a stored position in which the sections are stacked in an overlapping fashion relative to each other. As the sections move from the deployed position to the stowed position, the sections preferably remain somewhat parallel to one another, linearly moving the second section from the deployed position to a stowed position in which the first and second sections at least partially overlap one another. Accordingly, in one embodiment, the stowed orientation stacks the fixed platform section and the moveable platform section for a low vertical profile. Additionally, the wheelchair access system with the platform sections in their stacked, stowed orientation minimizes the space used within the vehicle for storage while providing a less cumbersome structure than conventional wheelchair lift apparatus presently employed. Therefore, the present invention makes it possible to provide an extended platform length when deployed without increasing the storage space within the vehicle and, furthermore, without obstructing the view through the vehicle window or door. By employing at least two platform sections, one moveable and one fixed, the platform structure may be automatically stacked and stowed in a position to form a low-height and width profile in a substantially vertical orientation adjacent the vehicle opening. To this end, the vertical height or width of the stacked platform structure may be approximately half the horizontal length or width, respectively, of the unfolded platform structure with the wheelchair lift in the deployed orientation. In another embodiment that provides an extended length platform, the platform sections are proportioned non-symmetrically with respect to the overall platform length so that the vertical height of the stacked platform structure fits within the height of a standard vehicle doorway.

In another aspect a pivotal linkage system is provided to maintain one platform section generally parallel to another platform section as the sections move from the deployed state to the stowed state. The linkage system has two ends, with one end pivotally coupled to the first platform section and the other end pivotally coupled to the second platform section. Each end of the linkage system pivots about an axis that is parallel to the pivoting axis of the other end of the system.

A further embodiment of the present invention relates to a linear actuator to move a wheelchair platform from a first position to a second position by placing moving a flexible coupling that is coupled by a pulley to at least one arm that supports the platform.

BRIEF DESCRIPTION OF THE DRAWINGS

The invention is best understood by reference to the following detailed description of the exemplary embodiments in conjunction with the accompanying exemplary drawings, wherein:

FIGS. 1 and 2 show a vehicle employing a wheelchair access system in accordance with a first embodiment the present invention;

FIGS. 6 and 6A show a perspective and cross-sectional view of the wheelchair access system in the deployed transfer level position with the fixed platform section and moveable platform section extended to provide the platform structure;

DETAILED DESCRIPTION OF THE EXEMPLARY EMBODIMENTS

Figure 3:
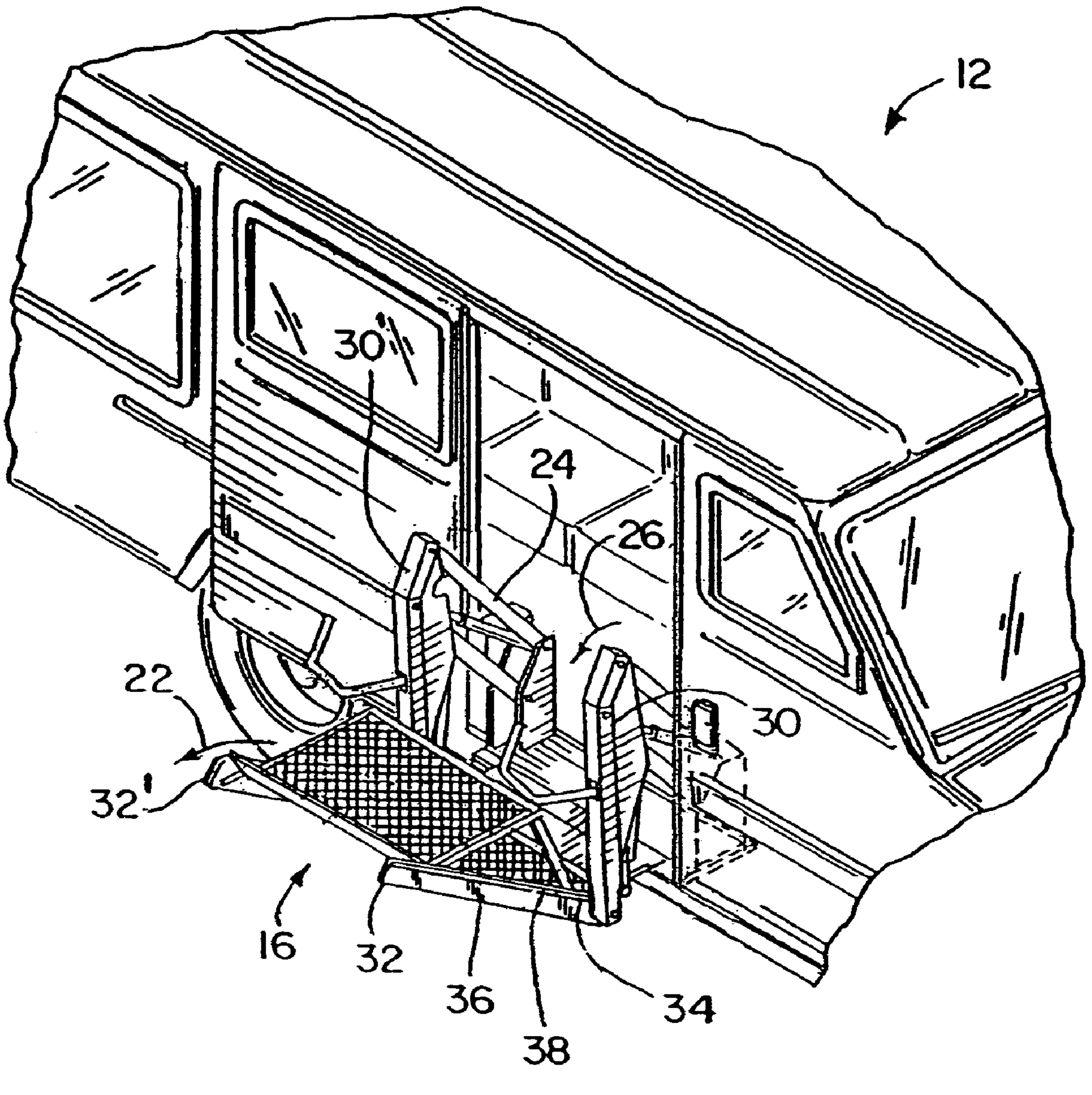
FIGS. 3, 4 and 5 illustrate the deployment of the wheelchair access system in various stages of deployment from the initial stowed position of FIG. 2 in accordance with the invention.

With reference to the drawings and particularly FIGS. 1 and 2, a wheelchair access system 10 is shown for use in conjunction with a vehicle 12. The vehicle 12 has a floor 14, upon which the wheelchair access system 10 is mounted, and from which a stacking platform structure 16 may be deployed and stowed. The vehicle 12 has a door 18 and a window 20 therein, which as shown in FIG. 2 may slide or otherwise provide open access to the vehicle 12 for use of the wheelchair access system 10. It will be appreciated that in one embodiment the stacking platform structure 16 of the wheelchair access system 10 has a sufficiently low vertical profile due to vertical clearance and sightline requirements so as to provide an unobstructed view through the window 20 with the stacking platform structure 16 in a vertically-stowed orientation.

Figure 4:
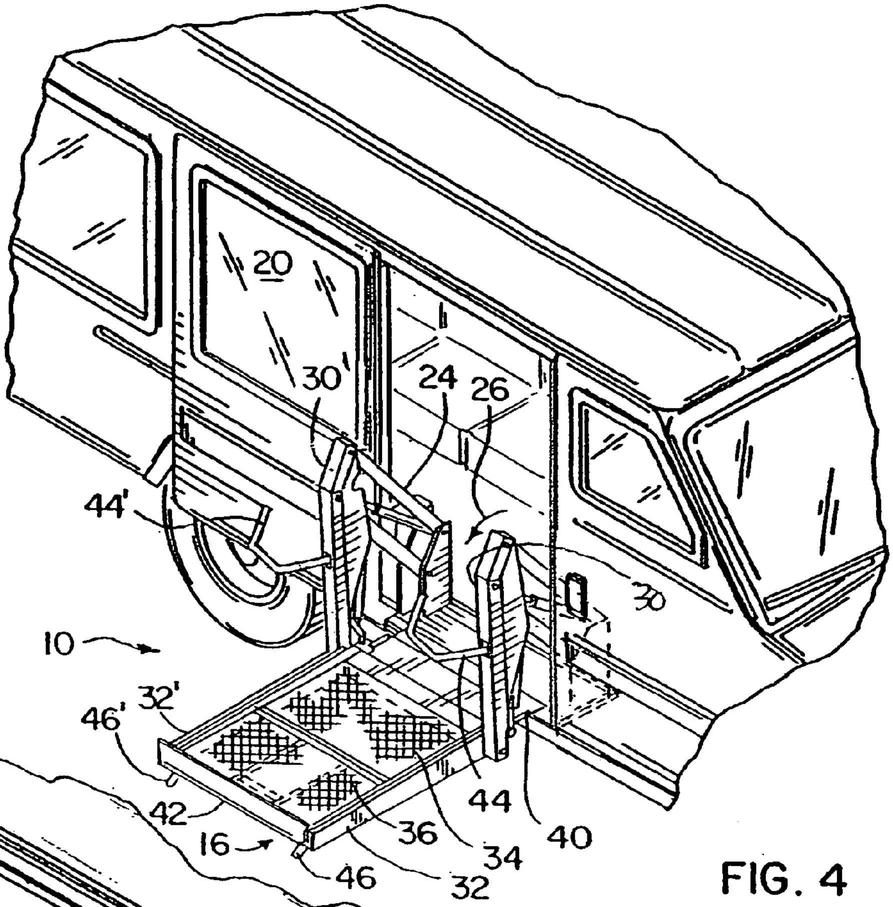
Figure 5:
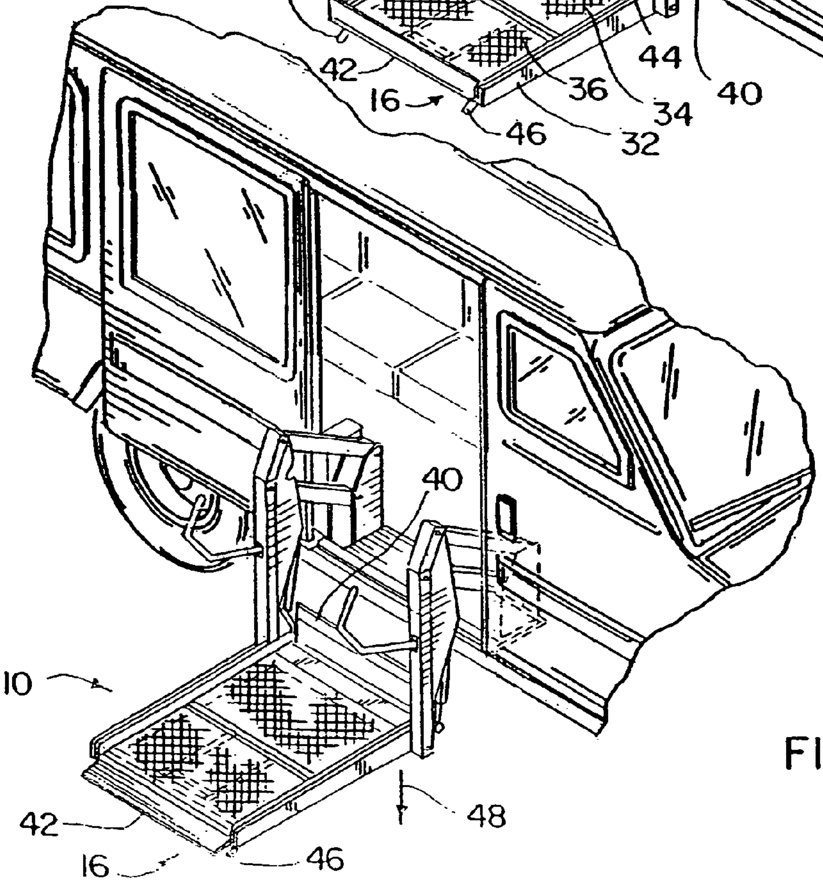

FIGS. 3, 4 and 5 are cut-away perspective views showing the side of the vehicle 12 with door 18 open and the platform structure 16 of the wheelchair access system 10 partially deployed in FIG. 3, with deployment proceeding through the transfer level position at FIG. 4 and ground level position at FIG. 5. FIG. 3 particularly illustrates the use of a stacking platform operation with motion indicated by arrow 22 as the lift platform structure 16 is deployed by an actuator for moving the platform between positions inboard and outboard vehicle 12 as indicated by the motion of arrow 26. Herein, the actuator 24 is provided as a parallelogram hydraulic lifting mechanism employing pivotal lifting arms for raising and lowering the platform structure as used in the wheelchair lift apparatus previously disclosed by applicant's assignee in U.S. Pat. No. 5,261,779 to Goodrich for "Dual Hydraulic Parallelogram Wheelchair Lift" issued 16 Nov. 1993, U.S. Pat. No. 6,238,169 to Dupuy, et al. for "Dual Function In Board Barrier/Bridgeplate Assembly for a Wheelchair Lift" issued 29 May 2001, and U.S. Pat. No. 5,806,632 to Budd, et al. for "Spring Assist System for Gravity Deployment of Stowed Platform Wheelchair Lifter" issued 15 Sep. 1998, which are hereby incorporated by reference in their entirety. With reference to FIG. 6, the general arrangement of the vehicle-mounted parallelogram wheelchair lift actuator 24 is further illustrated so as to show the hydraulic actuator cylinders 28 and 28' for operating the parallelogram structures that are coupled to a right-side vertical arm 30 and a left-side vertical arm 30' powerable for moving between positions outboard and inboard the vehicle 12. The parallelogram structure employing the hydraulic actuator 24 powerable for moving the right-side and left-side vertical arms 30, 30' employs a hydraulic pump/control assembly (not shown) mounted in the vehicle 12. Alternatively, other actuators powerable by way of mechanical, electrical or pneumatic operations and the like may be used for deploying and stowing the lift platform structure.

The wheelchair access system 10 is thus operable for deployment and stowing of the platform structure 16 with the right-side and left-side vertical arms 30, 30', each of which include an upper end and a lower end. As shown in FIG. 3, the system 10 further includes a right-side elongated support 32 and a left-side elongated support 32'. The right-side and left-side elongated supports 32, 32' each provide side rails and barriers of the respective right and left-hand sides of the platform structure 16, as discussed further below. The platform structure 16 includes a fixed platform section 34 attached intermediate to the right-side and left-side elongated supports 32, 32', and with reference to portions thereof, each elongated support includes a proximal (or inboard) half and a distal (or outboard) half with respect to the vertical arms 30, 30' such that each elongated support 32, 32' may be referenced in terms of portions thereof, including a first proximal portion and a second distal portion. Herein, the first proximal portion of the right-side elongated support 32 is pivotably coupled with the right-side vertical arm 30. Likewise, the left-side elongated support 32' has a first proximal portion and a second distal portion, the first proximal portion of the left-side elongated support 32' being pivotably coupled with the left-side vertical arm 30'. As shown, the right-side and left-side vertical arms 30, 30' having upper ends and lower ends, are coupled to the first portions of the right-side and left-side elongated supports 32, 32' with the actuator 24 being powerable for moving the right-side and left-side vertical arms 30, 30' between positions inboard and outboard the vehicle 12.

With the fixed platform section 34 attached intermediate to the first portions of the right-side and left-side elongated supports 32, 32', a moveable platform section 36 is additionally coupled intermediate to the right-side and left-side elongated supports 32, 32' for movement between the first portions and the second portions thereof. To this end, the elongated supports 32, 32' provide side rails in which the moveable platform section 36 travels between the first and second portions. As discussed further, a linkage 38 is connected to the moveable platform section 36 for movement with the actuator 24 between a stowed orientation with the moveable platform section 36 stowed and overlapping the fixed platform section 34 at the first portions of the elongated supports 32, 32', and further providing a deployed orientation with the moveable platform section 36 moved to the second portions thereof for extending the platform structure 16 with the moveable platform section 36 moved into position alongside and coplanar with the fixed platform section 34 as shown in FIG. 4. Although the section 34, 36 are illustrated to be generally the same shape and size so that each is approximately half of the overall platform length, they may be sized otherwise as described hereafter with regard to another embodiment.

In FIG. 4 a dual-function barrier/transfer plate 40 is shown extended to bridge between the fixed platform section 34 of platform structure 16 and the vehicle inboard floor. In the illustrated transfer level position, it will be appreciated that the right-side and left-side elongated supports 32, 32' provide side barrier walls elevated from the fixed platform and moveable platform sections 34-36 to provide rollstops on the respective sides thereof, with the dual-function rollstop barrier/transfer plate 40 providing rollstop and transfer functions for access inboard the vehicle 12 at the floor thereof. Additionally, at the outboard end of the platform structure 16, a rollstop barrier 42 is elevated in the transfer position of FIG. 4. When in use, bridgeplates or rollstops 40, 42 are raised at the outboard and inboard ends of the wheelchair platform to prevent a wheelchair located on the platform from accidentally rolling off the platform. Such rollstops also function as ramps to facilitate movement of a wheelchair onto and off the wheelchair platform. The access system 10 further includes handrails 44, 44' extending horizontally from vertical arms 30, 30' when the platform structure 16 is deployed in horizontal positions as shown in FIGS. 4 and 5. The handrails 44, 44' fold vertically relative to vertical arms 30, 30' so as to extend along vertical arms 30, 30' when the platform structure 16 is in its vertically stowed position of FIG. 2.

The platform structure 16 also includes torsion spring-loaded rollstop feet 46, 46' to raise and lower the rollstop 42 rollstop position as between upright in FIG. 4 and extended in FIG. 5 allowing transfer of a wheelchair onto the platform structure 16 via the extended transfer level position. To make operation of the lift as convenient and safe as possible, the inboard and outboard rollstops 40, 42 are automatically raised and lowered in response to the operation and position of the wheelchair lift 10. When the wheelchair platform 16 rests on the ground, the outboard rollstop barrier 42 is lowered to provide a ramp onto the platform structure 16 and the inboard barrier plate 40 is raised to act as a stop. During lifting or lowering of the platform, both barriers 40, 42 are raised to act as stops to prevent a wheelchair from rolling off either end of the platform 16. When the platform 16 is raised to the height of the vehicle floor 14, the outboard barrier 42 remains raised to act as a stop and the inboard barrier 40 is lowered to provide a ramp between the platform 16 and the vehicle floor 14. As shown in FIG. 5 with the platform structure 16 extended downwardly as indicated by arrow 48 to a ground level position, the rollstop 42 is extended with the rollstop feet 46 establishing contact with the ground acting through a torsion bar to allow the spring-loaded rollstop barrier 42 to extend.

FIGS. 6 and 6A show a perspective and cross-sectional view of the wheelchair access system 10 in the deployed transfer level position of FIG. 4 with the fixed platform section 34 and the moveable platform section 36 extended to provide the platform structure 16. As shown, the respective platform section surface plate covering platform section cover 50 is shown in mesh cross-section, which may be provided with appropriate support surfaces such as a meshed grid-like surface or a solid plate-like surface that may provide a uniform, smooth running surface, such as an aluminum plate with non-slip powder coating adhered thereto.

A guiding portion, groove or track 52, 52' is provided on respective sides of the right-side and left-side elongated supports 32, 32' for receiving a roller or the like at the outer edges of the moveable platform section 36 for guiding the moveable platform section 36 along tracks 52, 52'. As shown in cross-section in FIG. 6A, the elongated support 32 and a side wall covering 54 are spaced apart to receives a roller therebetween and within track 52 for facilitating movement of the moveable platform 36 by captive sliding of the roller or the like within the tracks 52, 52'. The side wall covering 54 thereby conceals the track and roller so as to provide a solid side wall barrier for the platform structure 16.

Figure 7:
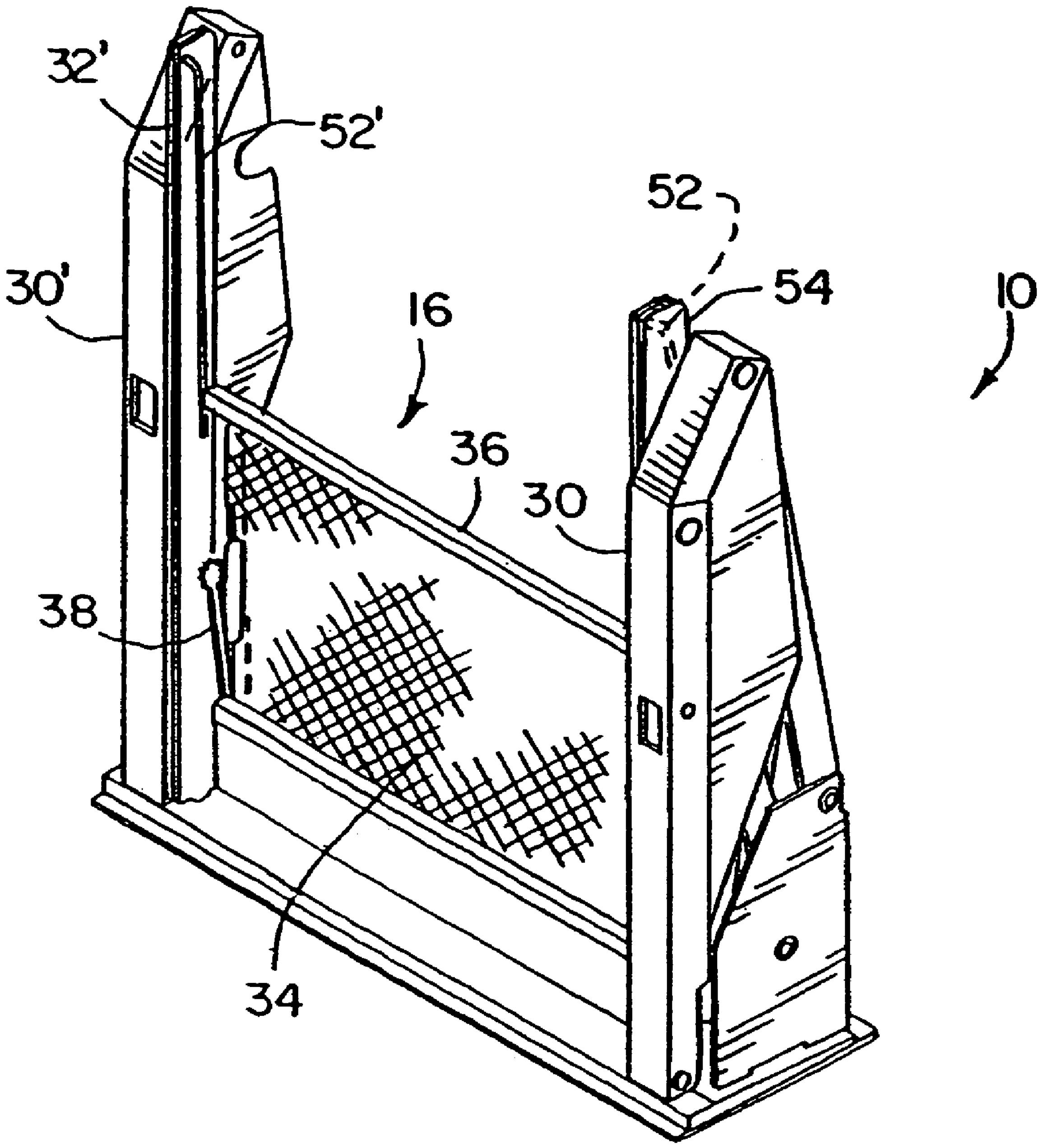
FIG. 7 illustrates the stowed orientation of the platform structure of the wheelchair lift providing a low vertical profile and compact overall profile.

FIG. 7 illustrates the stowed orientation of the platform structure 16 with the fixed and moveable platform sections 34, 36 stacked or overlapping relative to one another to a reduced height configuration, avoiding obstruction of all or part of the window of the vehicle 12 adjacent to the lift access system 10 with a compact overall profile. It will be appreciated that the elongated supports 32, 32' facilitate a narrow profile in the stacking structure described herein, since the elongated supports 32, 32' remain extended rather than folded, which would require a wider profile dimension. As shown, tracks 52, 52' allow the moveable platform section 36 to be supported vertically therein, with the linkage 38 extending to the lower portion of the access system 10 to draw the moveable platform section 36 to the first portions of the right-side and left-side elongated supports 32, 32' in the stowed orientation.

Figure 8:
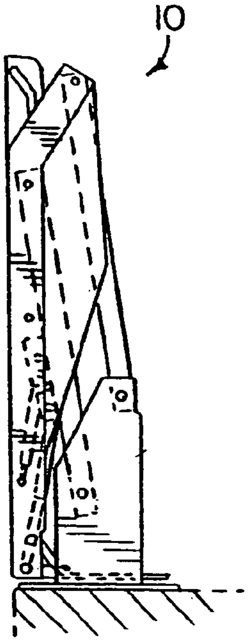
FIGS. 8-12 are side-elevation views of the wheelchair lift at different lift positions, with FIG. 8 showing the stowed orientation, partial deployment at FIG. 9 extending to transfer level deployment at FIG. 10, and FIG. 11 illustrating movement with the parallelogram structure to lower the platform structure to ground level at FIG. 12.
Figure 9:
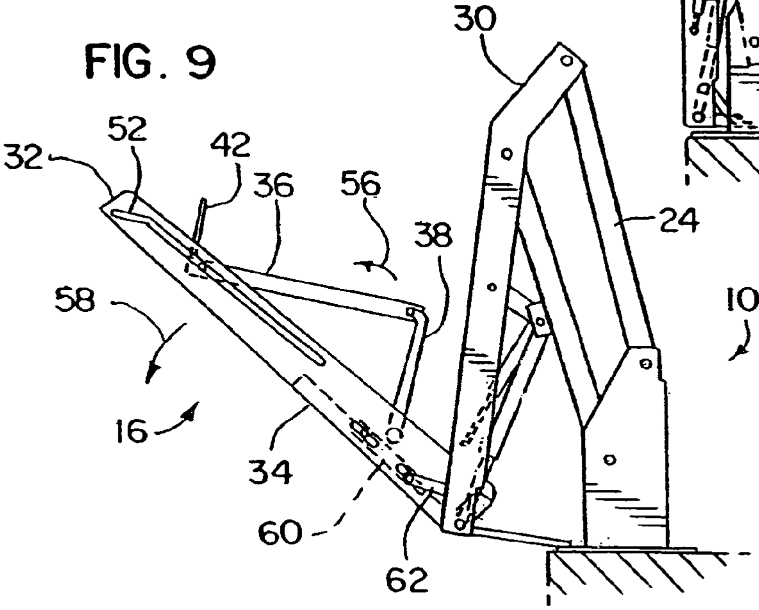
Figure 10:
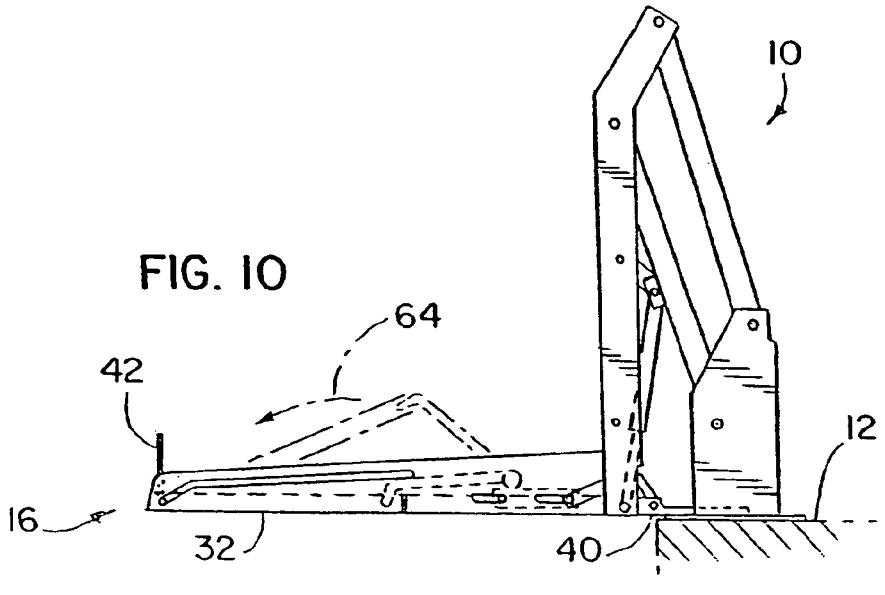
Figure 11:
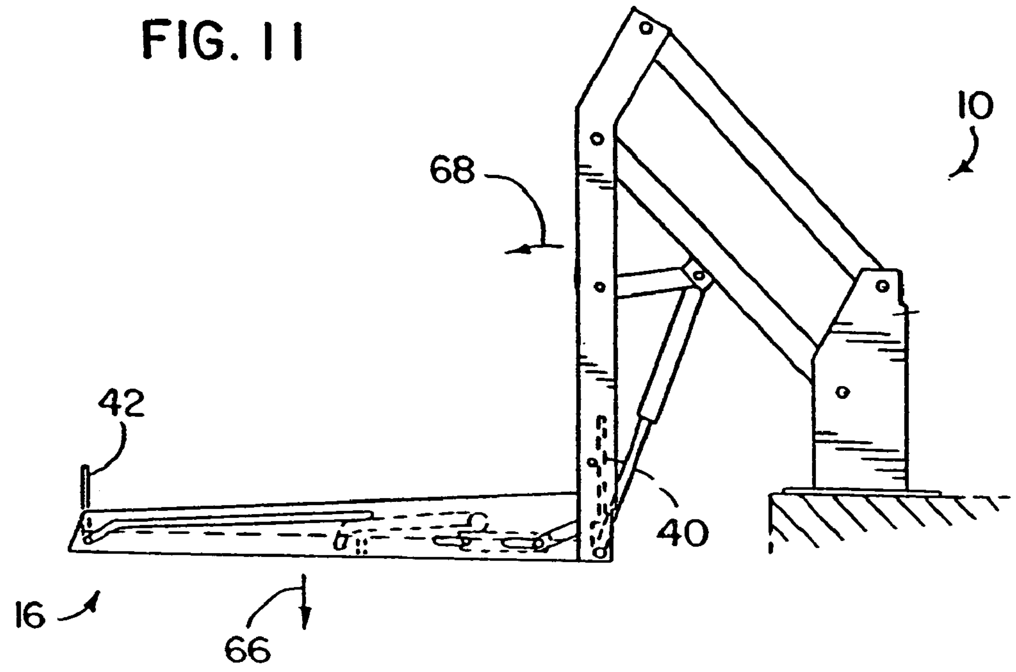
Figure 12:
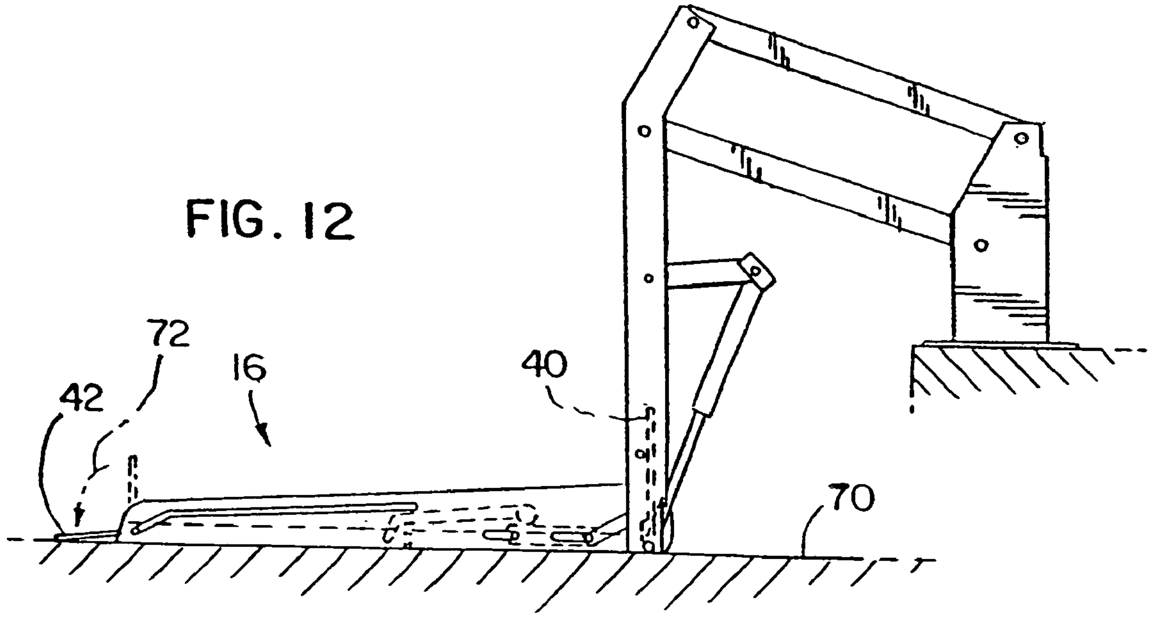

FIGS. 8-12 are side-elevation views of the wheelchair access system 10 at different lift positions, with FIG. 8 showing the stowed orientation, partial deployment at FIG. 9, transfer level deployment at FIG. 10, an intermediate position at FIG. 11 and the ground level position at FIG. 12. FIG. 8 illustrates a side elevation view showing the narrow profile of the wheelchair access system 10 for compact storage within the vehicle 12. FIG. 9 illustrates operation of the linkage 38 connected to the moveable platform section 36 for movement with the parallelogram structure actuator 24 from the stowed orientation with the moveable platform section 36 traveling along tracks 52, 52' of the elongated supports 32, 32'. Arrow 56 indicates movement of the moveable platform section 36 via linkage 38, and arrow 64 (FIG. 10) indicates the further downward and outward movement of the platform structure 16 as it is deployed outboard from its stowed orientation. As will be described further below, the linkage 38 is connected to the moveable platform section 36 for movement with the actuator 24 to extend the moveable platform section 36 from its stowed, overlapping vertical orientation with the fixed platform section 34. The linkage 38 is connected to the moveable platform section 36 for linearly moving the moveable platform section 36 relative to the first platform section in response to the position of the platform between a stowed and deployed position with respect to the fixed platform section 34. The linkage 38 further includes a gear assembly 60 for coupling to the moveable platform section 36. The gear assembly 60 includes a rack gear and pinion arm assembly discussed further below, operable with the actuator 24.

The deployment of the platform structure 16, and the moveable platform section 36 in particular, may be operated at a rate of deployment variably regulated with the hydraulic operation of the parallelogram lift mechanism of the actuator 24. The gear assembly 60 has a control link 62, coupled with the vertical arm as discussed further below for controlling deployment of the moveable platform 36 with the actuator 24. FIG. 10 shows continued deployment of the system 10 as indicated by arrow 64 to the transfer level position with the inboard dual-function rollstop barrier/transfer plate 40 extending to the floor of the vehicle 12, allowing transfer of a wheelchair between the vehicle 12 and the platform structure 16 of the access system 10. Further deployment, as illustrated in FIG. 11, raises the inboard dual-function rollstop barrier/transfer plate 40 as the platform 16 is lowered to ground level as indicated by the direction of arrow 66. Arrow 68 indicates movement of the access system 10 outwardly and away from the vehicle 12. The platform structure 16 is brought to rest at ground level 70, as shown in FIG. 12, as the rollstop barrier 42 is lowered when the torsion spring-loaded rollstop feet 46, 46' contact the ground.

Figure 13:
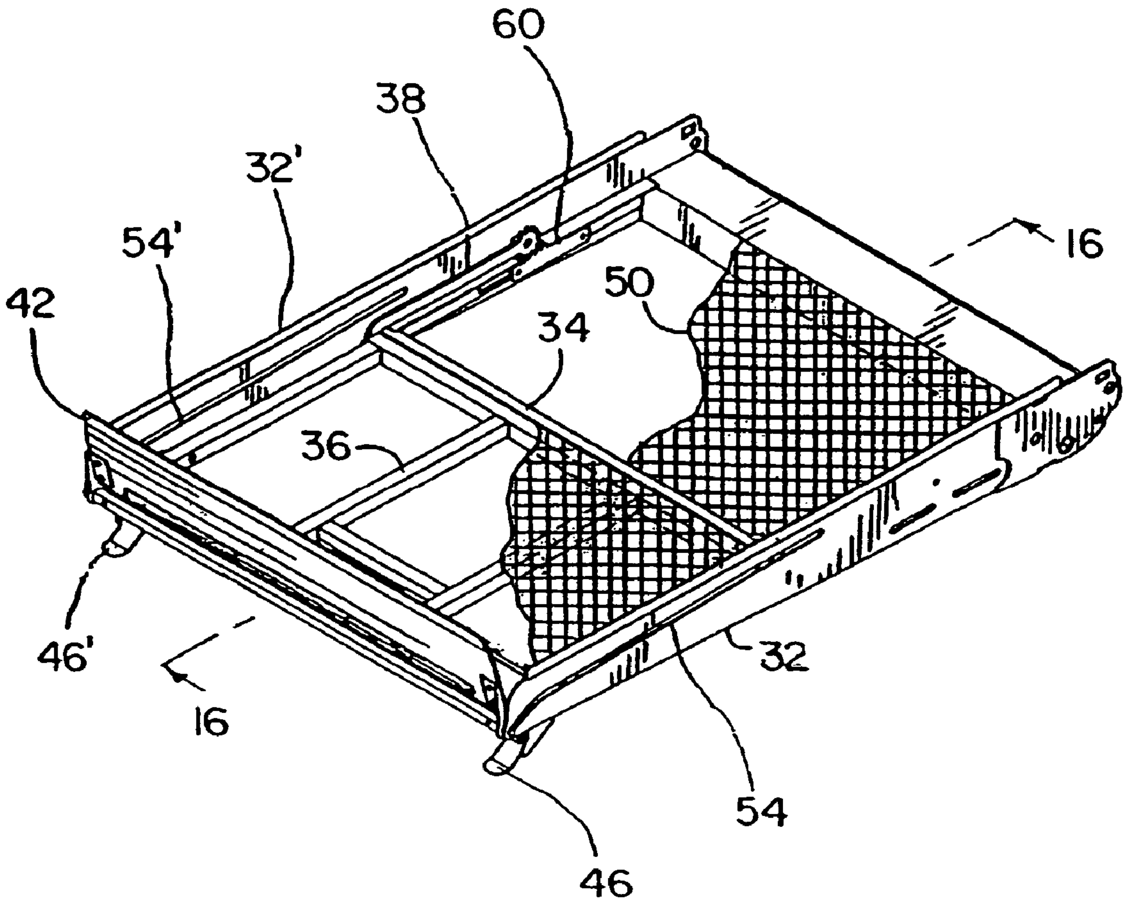
FIGS. 13-15 illustrate the platform structure with the floor plates sectioned to expose linkage and gear assemblies for movement of the moveable platform section with respect to the fixed section.
Figure 14:
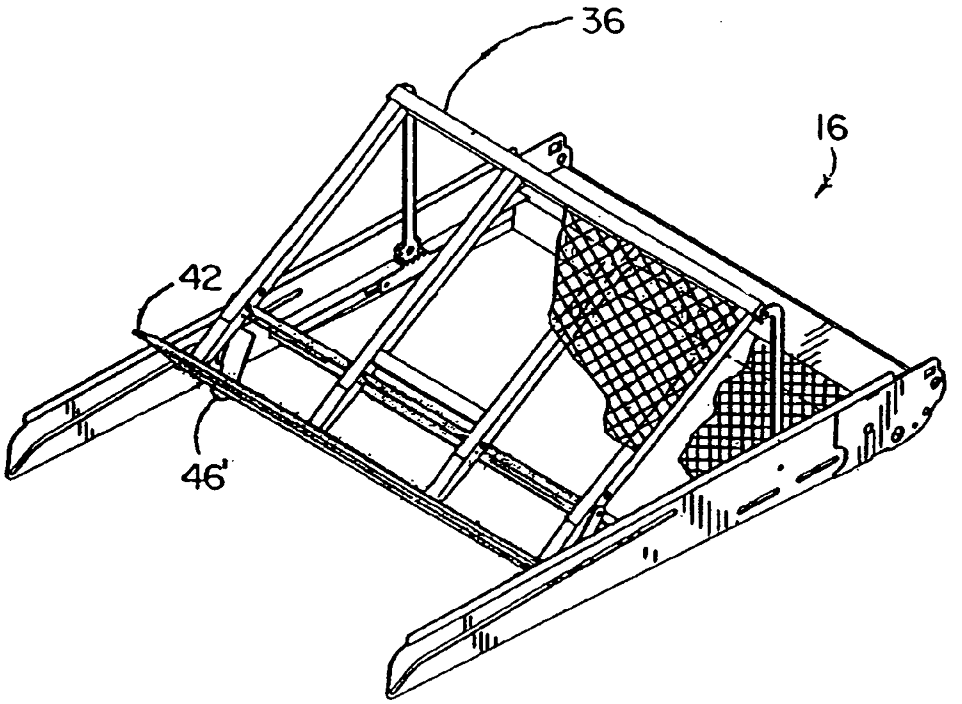
Figure 15:
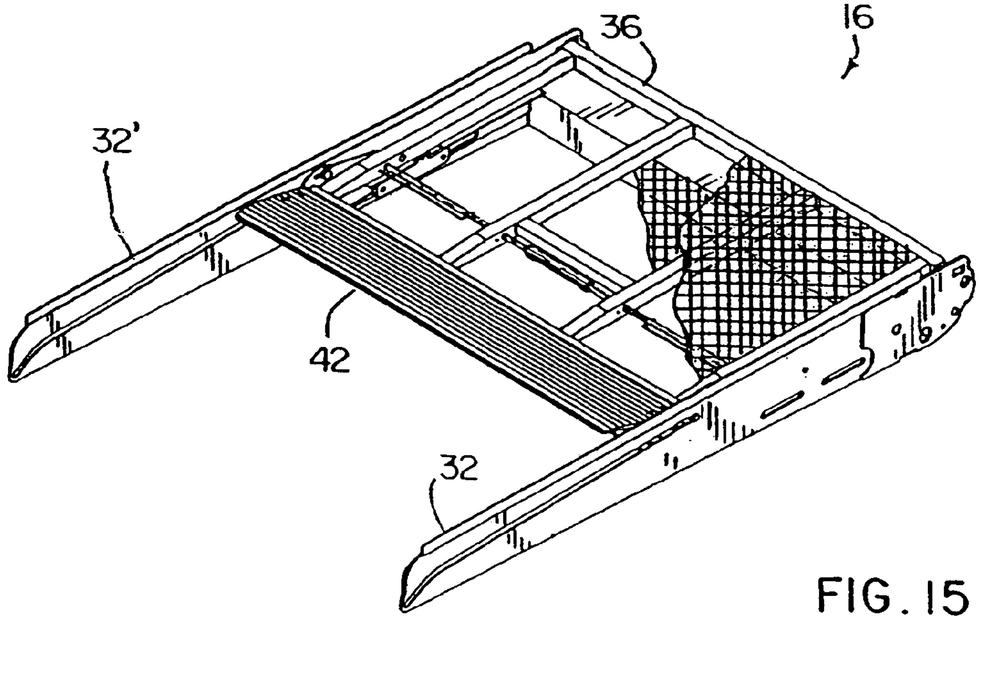

FIGS. 13-15 illustrate the platform structure 16 with the floor plate section cover 50 shown in cross-section to expose the linkage 38 and gear assembly 60 which moves the moveable platform section 36 with respect to the fixed section 34. In FIG. 14, as the moveable platform section 36 moves upward from the transfer level position to a stowed position, the rollstop barrier 42 remains raised or generally perpendicular to the platform section 36. As the moveable platform section 36 reaches its fully stowed position, i.e., overlapping the fixed platform section 34 thereunder as shown in FIG. 15, the rollstop feet 46, 46' contact a portion of the platform structure 16, particularly the outboard edge of the fixed section 34 as shown in FIG. 18, to extend the rollstop barrier 42 for a stowed orientation with a low profile with the elongated supports 32, 32'.

Figure 16:
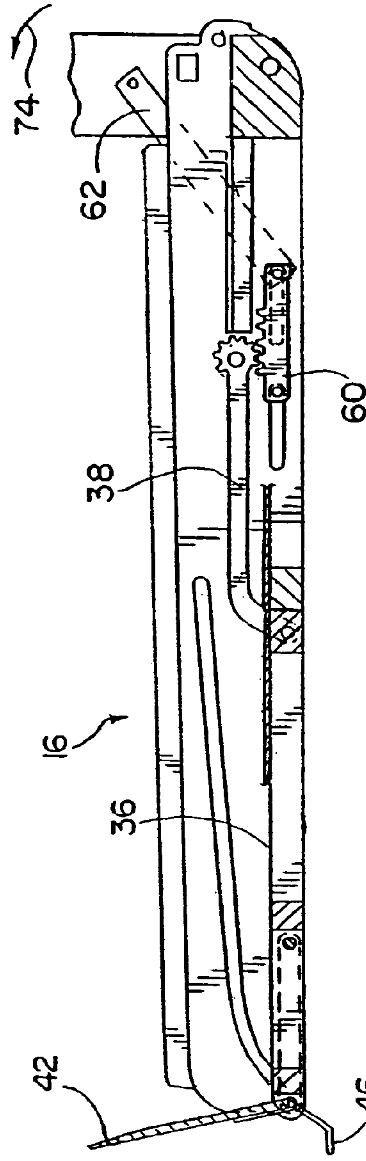
FIGS. 16-19 further illustrate deployment and particularly the rack gear and pinion linkage assemblies used in the platform structure of the wheelchair access system in accordance with the present invention.
Figure 17:
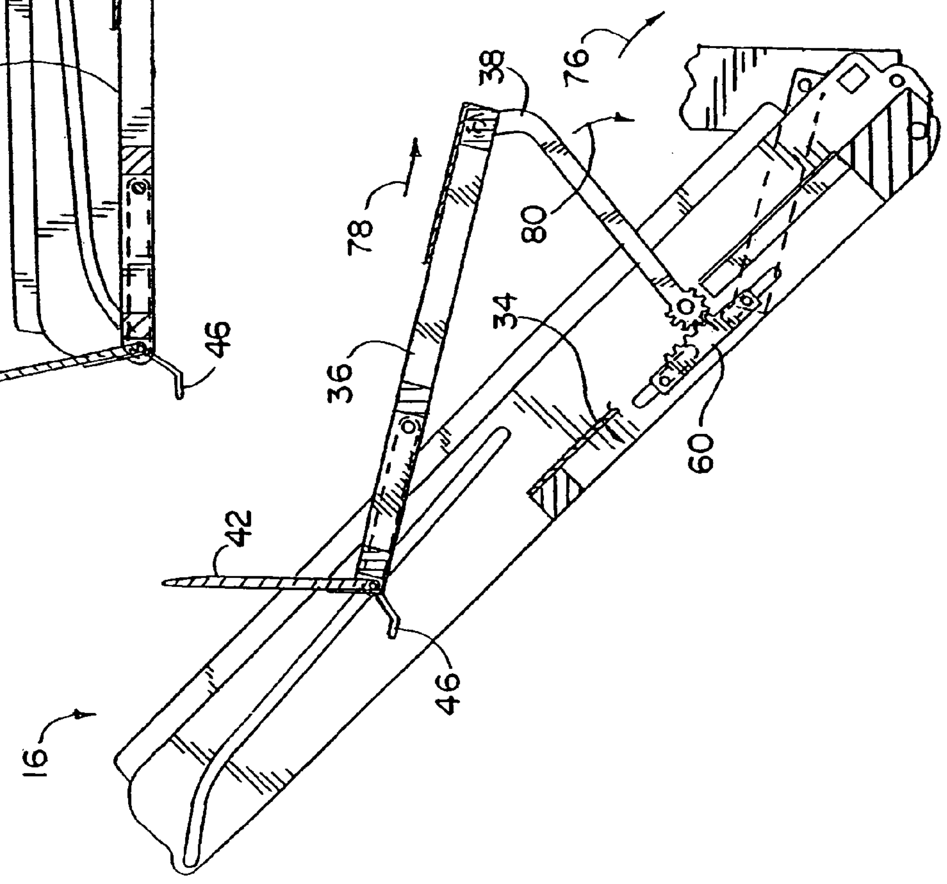
Figure 18:
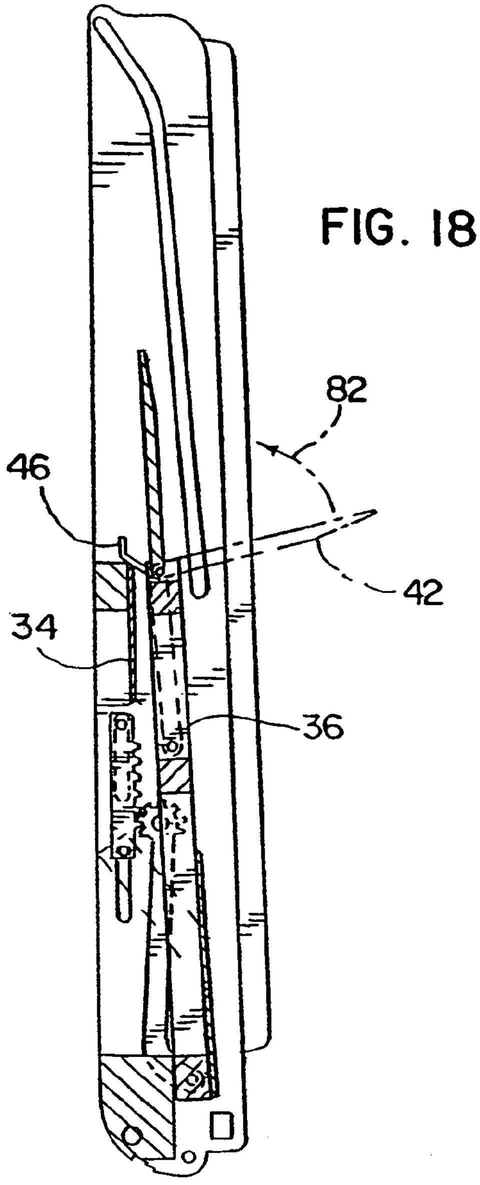

FIG. 16 provides a cross-sectional view of FIG. 13, and FIGS. 16-19 further illustrate the rack and pinion linkage assemblies of the gear assembly 60 used in stowing the moveable platform section 36 and the barrier rollstop 42 for the low-profile orientation of the platform structure 16. The gear assembly 60 is coupled with the gear link 62 to the vertical arm 30, such that as the vertical arms 30, 32 move between deployed and stowed positions, the vertical arm 30 moves as indicated by arrow 74 in FIG. 16 and arrow 76 in FIG. 17 to thereby move the linkage 38, causing movement of the moveable platform section 36 between stowed and deployed orientations as indicated by arrows 78 and 80 in FIG. 17. As shown in FIG. 18, as the moveable platform section 36 attains its fully-stowed orientation within the platform structure 16, the rollstop barrier 42 moves to the extended stowed orientation as the rollstop feet 46 come to rest against the upper surface of the fixed platform section 34.

Figure 19:
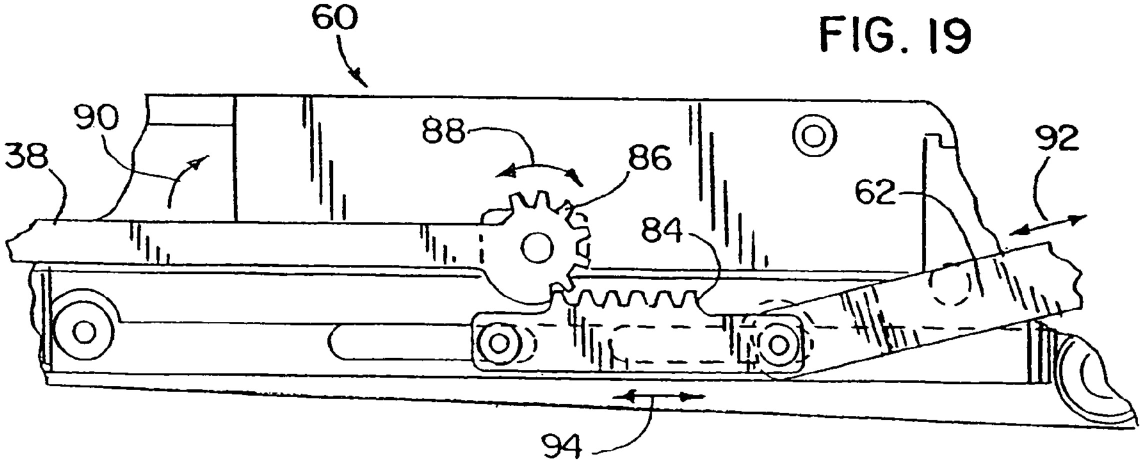

In FIG. 19, the gear assembly 60 is shown in exploded cross-section, showing rack gear teeth 84 and pinion gear teeth 86 to move the pinion arm as indicated by motion arrows 88 and 90. Rotation of gear link 62 along 92 translates movement to the rack gear of the gear assembly 60 as indicated by arrow 94. The rack and pinion gears are used to convert linear motion into rotation for precise control of the linkage 38 and the movement of the moveable platform section 36. The gear assembly 60 as illustrated in FIG. 19 may be deployed on one or both right-side and/or left-side elongated supports 32, 32' for movement with the respective vertical arms, 30, 30'.

Although the heretofore described embodiment of the access system 10 provides a stacking platform structure 16 with a low vertical profile, thereby facilitating an unobstructed view through the window 20, the platform sections 34, 36 may be sized and shaped otherwise. As illustrated in FIGS. 1-19, the platform structure 16 includes a fixed platform section 34 and a movable platform section 36 wherein the sections 34, 36 are similar in size and shape, and each is approximately half of the overall length of the platform structure 16. Although such symmetry of the sections 34, 36 provides a low vertical profile and unobstructed view through an adjacent window, there are instances where the foregoing symmetry benefits are offset by other factors. For example, some access system users may require a longer platform assembly 16 due to the type of mobility aid (e.g., wheelchair, scooter, etc.) being used or other requirements, practices or standards. To install an access system 10 having a longer platform assembly 16 into a typical vehicle 12, substantial and costly modifications to the vehicle 12 may be required, such as raising the roof or lowering the floor. To this end, when a longer platform assembly 16 is required, it would be advantageous to proportion the sections 34, 36 to be other than 50% of the total platform structure length so the platform assembly 16 can have a vertical stowed height allowing it to be completely and safely stowed in the standard or unmodified doorway height of a vehicle 12.

Figure 27:
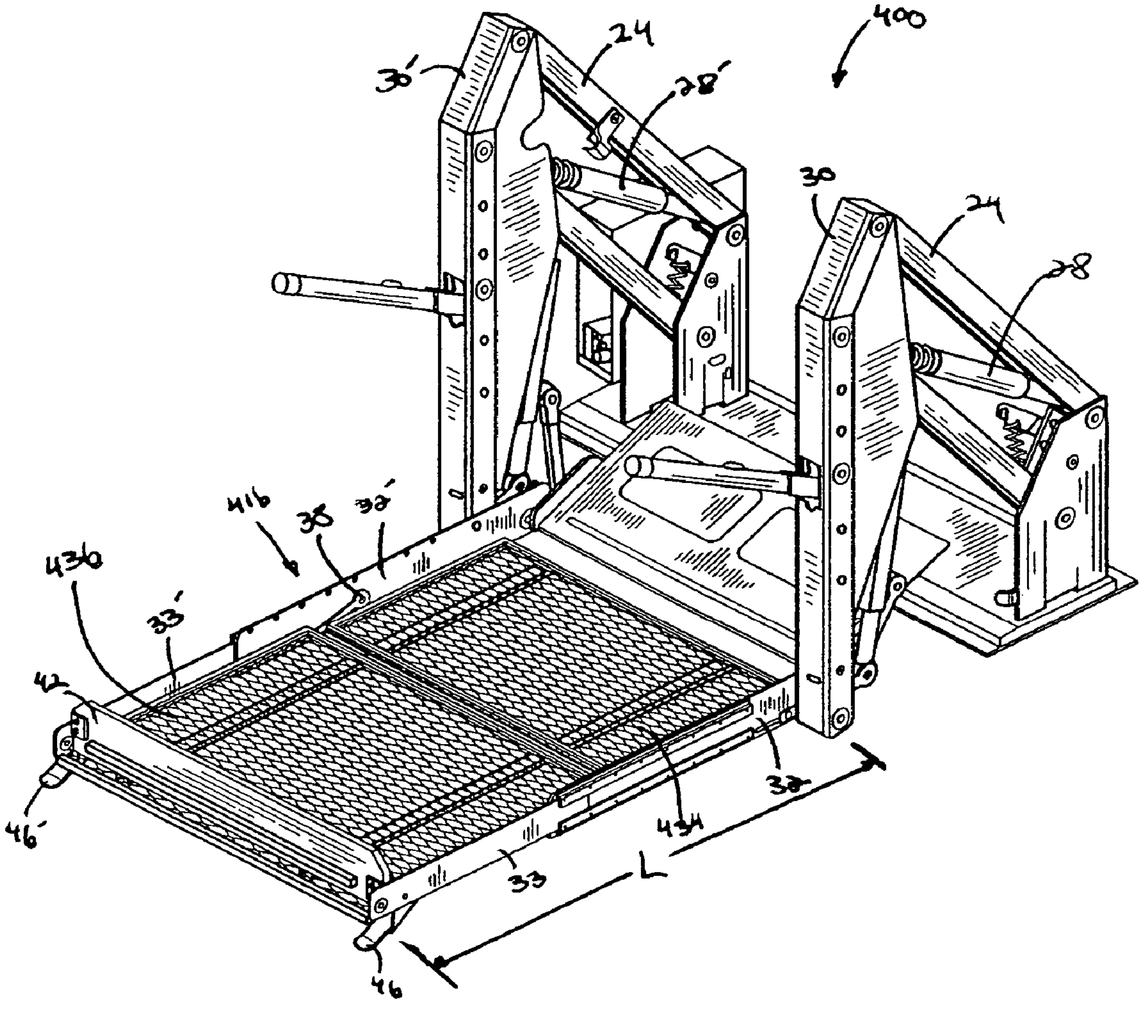
FIG. 27 is a perspective view of another embodiment of the wheelchair access system providing an extended length platform.
Figure 27A:
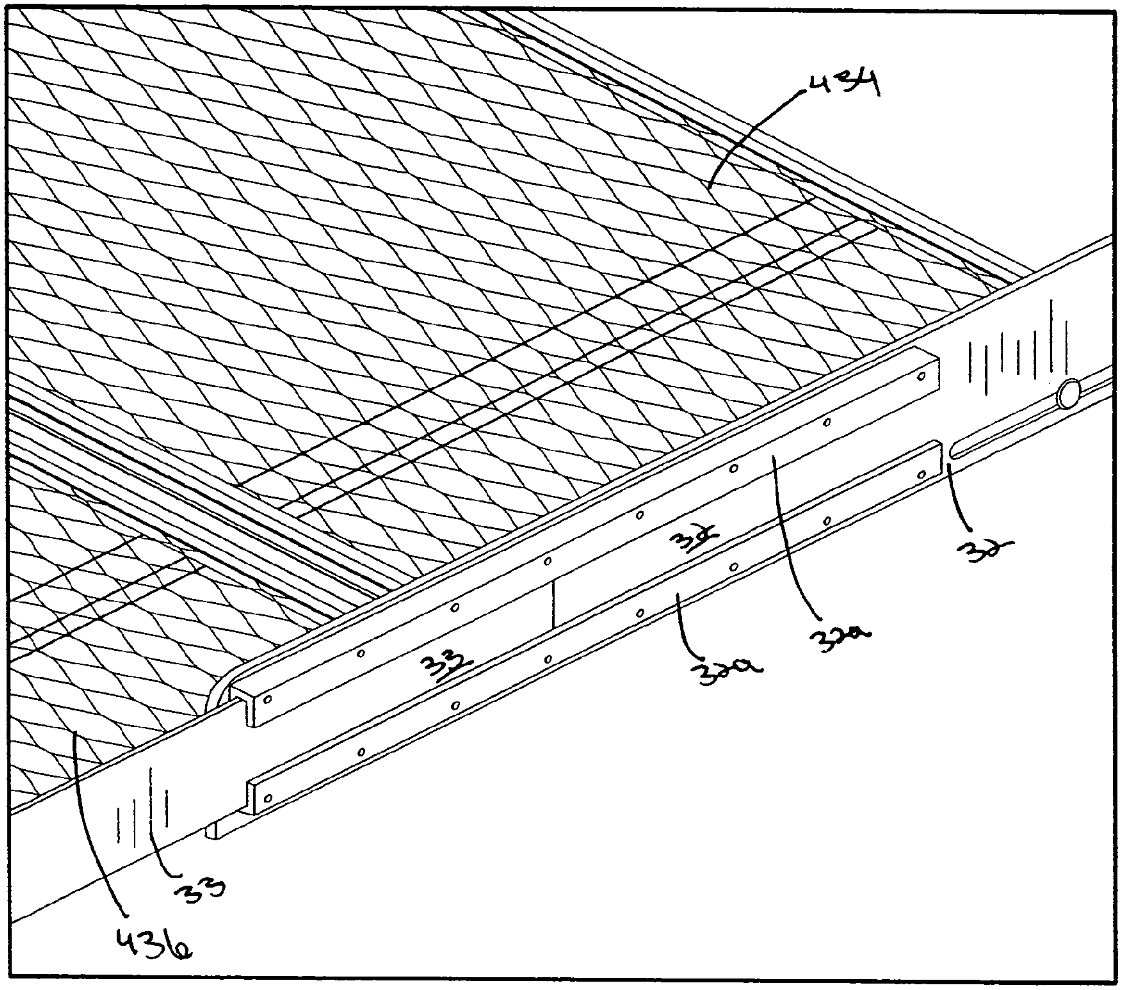
FIG. 27*a* is a detail view of the embodiment of FIG. 27 illustrating the platform side barrier.
Figure 28:
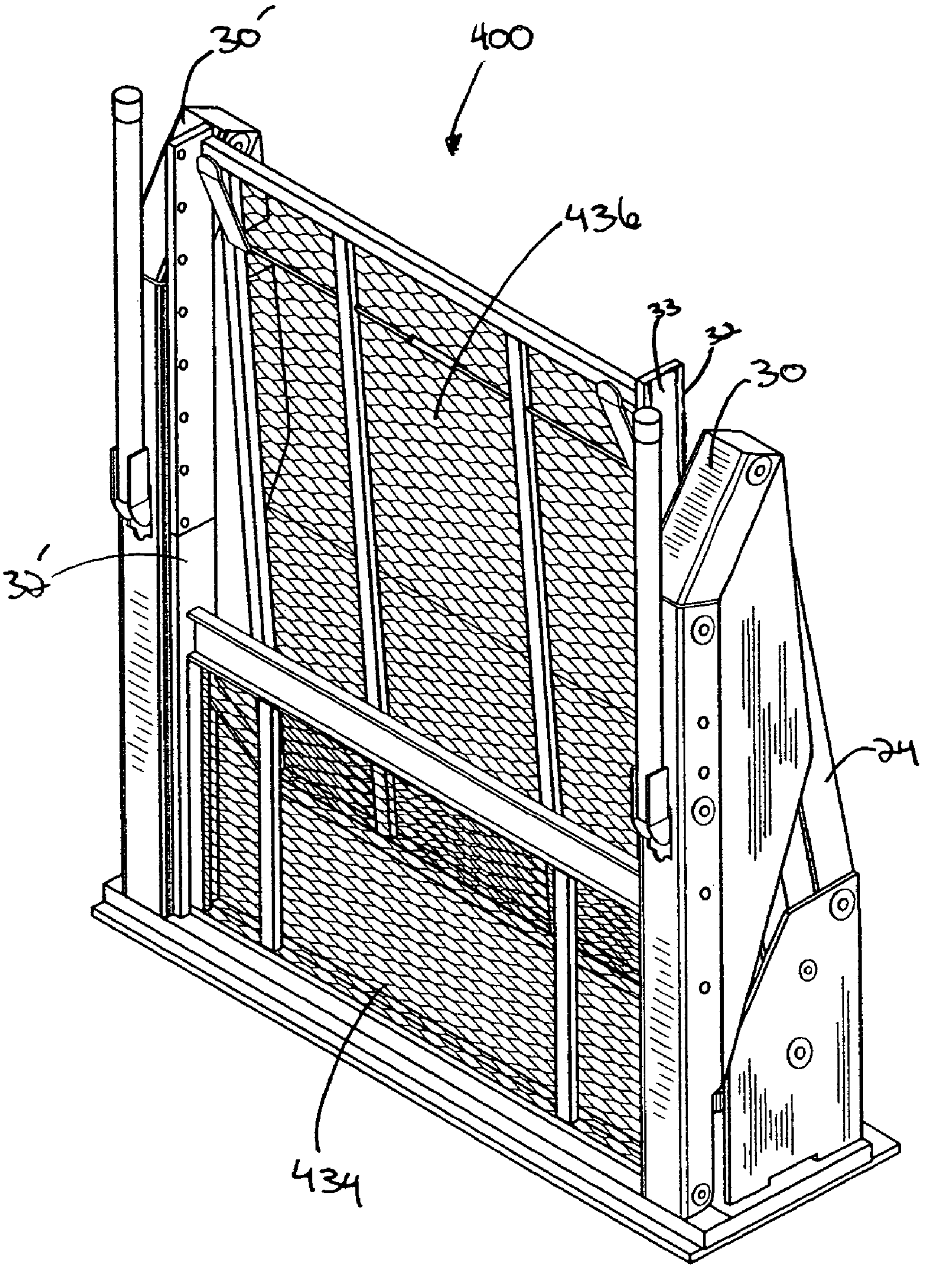
FIG. 28 is a perspective view of the embodiment of FIG. 27 showing the access system in a stowed orientation.

In view of the foregoing, FIGS. 27 and 28 illustrate another embodiment of the access system 10. As shown in FIG. 27, and similar to the access system 10 of FIG. 6, the extended length platform access system 400 is illustrated in the deployed transfer level position with the fixed platform section 434 and the movable platform section 436 extended to provide the platform structure 416. The access system 400 includes hydraulic actuator cylinders 28 and 28' for operating the parallelogram lifting structures and vertical lifting arms 30, 30' as discussed in detail above and for raising, lowering, folding, and stowing the access system 400 as known in the art. As shown, the fully deployed platform structure 416 has an extended length L that is longer than the platform structure 16 of FIG. 6. The fixed platform section 434 is fixed in position proximate the lifting arms 30, 30' and is approximately 33% of the extended length L. The movable platform section 436 is approximately 67% of the extended length L and is connected to a linkage 38 for movement between a stowed orientation with the movable platform section 436 stowed and overlapping the fixed platform section 434 (FIG. 28), and a deployed orientation with the movable platform section 436 moved into position alongside and coplanar with the fixed platform section 434 (FIG. 27). Although the platform section 434, 436 are illustrated and described hereafter as proportioned as 33% and 67% respectively, this is not to be limiting as other proportions for the sections 434, 436 may be suitable as well (e.g., 25%/75%, etc.).

As shown in FIG. 27, the fixed platform section 434 is bordered on its right and left sides by respective elongated supports 32, 32'. The supports 32, 32' are fixedly attached to the fixed platform section 434 and provide side barrier walls elevated from the platform structure 416. As shown, the supports 32, 32' extend outboardly a predetermined distance past the outboard edge of the fixed platform section 434 and end intermediate the inboard and outboard ends of the movable platform section 436. The supports 32, 32' include channel members **32*a*, 32*a*' fixedly attached to the outside of the supports 32, 32'. The channel members 32*a*, 32*a*' may be comprised of U-shaped, L-shaped, C-shaped, or other suitably shaped members so long as the channel members 32*a*, 32*a*' provide an outer flange or the like to slidably retain lengthwise planar members between the supports 32, 32' and the flanges. The channel member 32*a*, 32*a*' may be integral with the planar supports 32, 32', or alternatively may be affixed with one or more connectors (e.g., rivets, screws, bolts, etc.), welded or the like. The members 32*a*, 32*a*' are a predetermined length and extend along a substantial portion of the supports 32, 32'. As shown, the members 32*a*, 32*a*' extend outboardly from a point proximate the outboard edge of the fixed platform section 434, to the outboard edge of the supports 32, 32'**.

Similarly, the movable platform section 436 is bordered on its right and left sides by telescoping side barriers 33, 33'. The barriers 33, 33' are fixedly attached to the movable platform section 436 and together with supports 32, 32' provide side walls elevated from the platform structure 416 surface to prevent a platform occupant from falling off the access system 400 when it is deployed. As shown, the outboard end of the barriers 33, 33' is attached to the movable platform section 436 at its outboard end proximate to the outboard rollstop barrier 42. The inboard end of the barriers 33, 33' is held slidably captive in the channel members **32*a*, 32*a*' between the outer flanges and the supports 32, 32' as shown in the FIG. 27 detail view. Further, the barriers 33, 33' are sized and shaped to fit snugly and slidably telescope inboardly and outboardly within the channel members 32*a*, 32*a*' as the access system 400 is stowed and deployed, respectively. As shown, when the access system 400 is fully deployed, barriers 33, 33' extend outwardly from the outboard edge of the channel members 32*a*, 32*a*' in a cantilevered fashion. A portion of barriers 33, 33' overlaps with supports 32, 32' such that the movable platform section 436 (particularly the cantilevered portion) is adequately supported by the channel members 32*a*, 32*a*'. The barriers 33, 33' are substantially the same length as the channel members 32*a*, 32*a*', such that when the access system 400 is fully stowed, the barriers 33, 33' are substantially telescoped into the channel members 32*a*, 32*a*' and the platform sections 434, 436 are stowed as compactly as possible (see FIG. 28). Thus, the extended length platform structure 416 can be stowed in a standard height vehicle doorway without modifying the vehicle roof or floor. In one exemplary embodiment illustrated in FIG. 28, the stowed height of the stacked platform section 434, 436** is substantially the same as the height of the lifting mechanism, which is known to fit within the vertical clearance of typical vehicle doorways.

Hereafter, the stowage operation of the extended length platform access system 400 is described. Referring now to FIG. 27, the system 400 is deployed and ready to be stowed within the doorway of a vehicle. The system 400 is actuated by an operator or user to stow the platform 416. The hydraulic cylinders 28 act on the parallelogram lifting structure to begin to raise the platform 416. The gear assembly 60 (FIGS. 16-19) drives the linkage 38 to initially raise the inboard end of the movable platform section 436. Subsequently, the linkage 38 pulls the movable platform section 436 inboardly along with the barriers 33, 33' that slide inboardly within the channel members **32*a*, 32*a*'. The linkage 38 passes its apex and begins to lower the inboard end of the movable platform section 436 while continuing to pull the platform section 436 inboardly along with the barriers 33, 33'. As the linkage 38 reaches its fully stowed and inboard orientation, the movable platform section 436 comes to rest overlapping the fixed platform section 434 and the barriers 33, 33' are fully retracted and telescoped into the channel members 32*a*, 32*a*'. The extended length platform 416** is stowed in a substantially vertical orientation within the vehicle's doorway, and may obstruct a sightline through an adjacent door's window (if present) due to the platform's extended length (height).

The deployment operation of the extended length platform access system 400 is described as follows. Referring now to FIG. 28, the system 400 is stowed and ready to be deployed for use to load or unload a user of a vehicle. The system 400 is actuated by an operator or user to deploy the platform 416. Pressure in the hydraulic cylinders 28 is relieved so that gravity can act on the platform 416 to unfold and lower the platform 416 under gravity power. The gear assembly 60 (FIGS. 16-19) drives the linkage 38 forward/outboard to initially raise the inboard end of the movable platform section 436. Subsequently, the linkage 38 pushes the movable platform section 436 outboardly along with the barriers 33, 33' that telescope outboardly from the channel members 32*a*, 32*a*'. The linkage 38 passes its apex and begins to lower the inboard end of the movable platform section 436 while continuing to push the platform section 436 outboardly along with the telescoping barriers 33, 33'. As the linkage 38 is rotated to reach its fully deployed and outboard orientation, the movable platform section 436 comes to rest outboardly adjacent to and coplanar with the fixed platform section 434. The barriers 33, 33' are fully extended from the channel members 32*a*, 32*a*', and the extended length platform 416 is ready for lowering.

Figure 20:
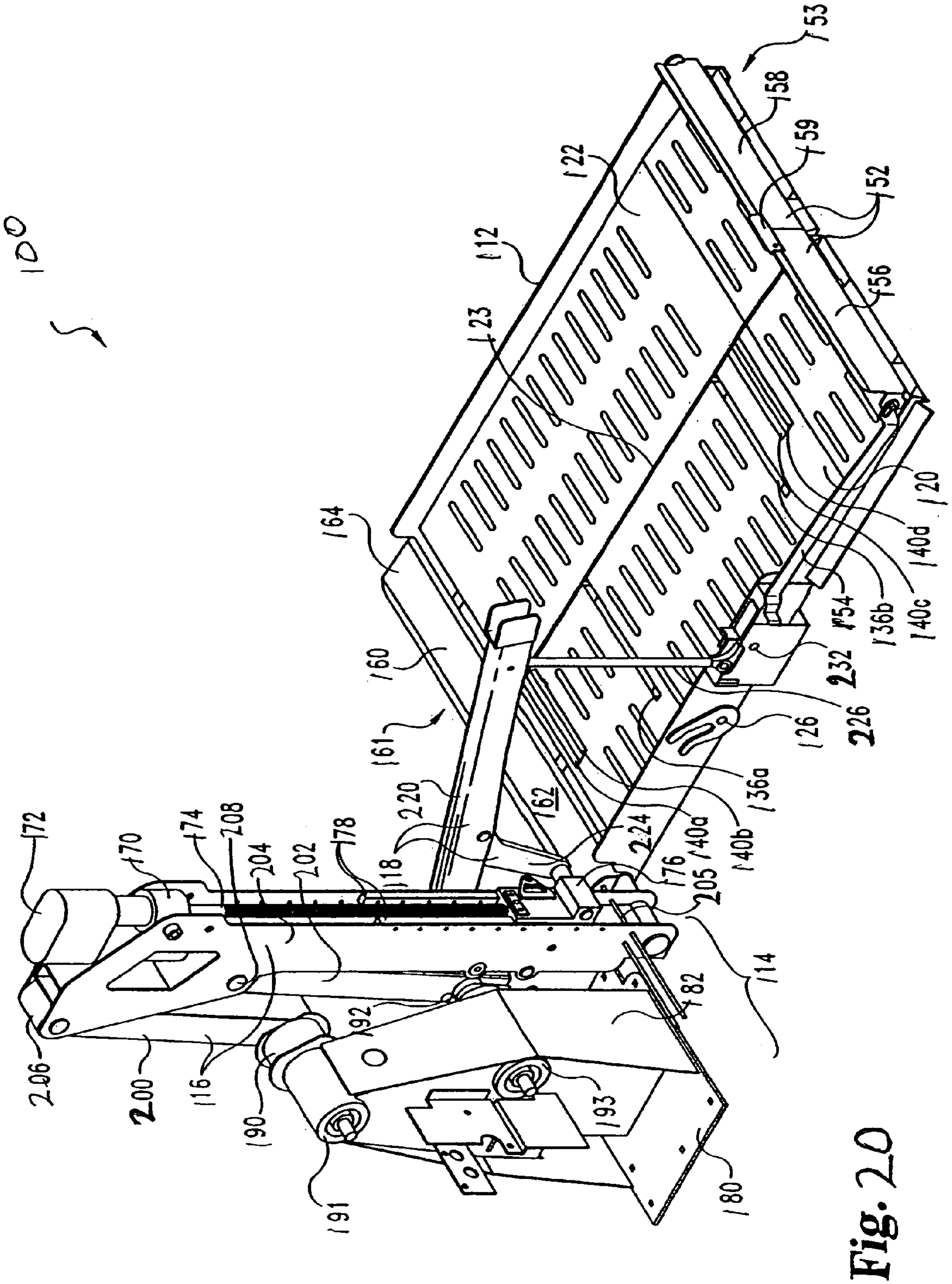
FIG. 20 is a perspective view of a second embodiment of the present invention.
Figure 21A:
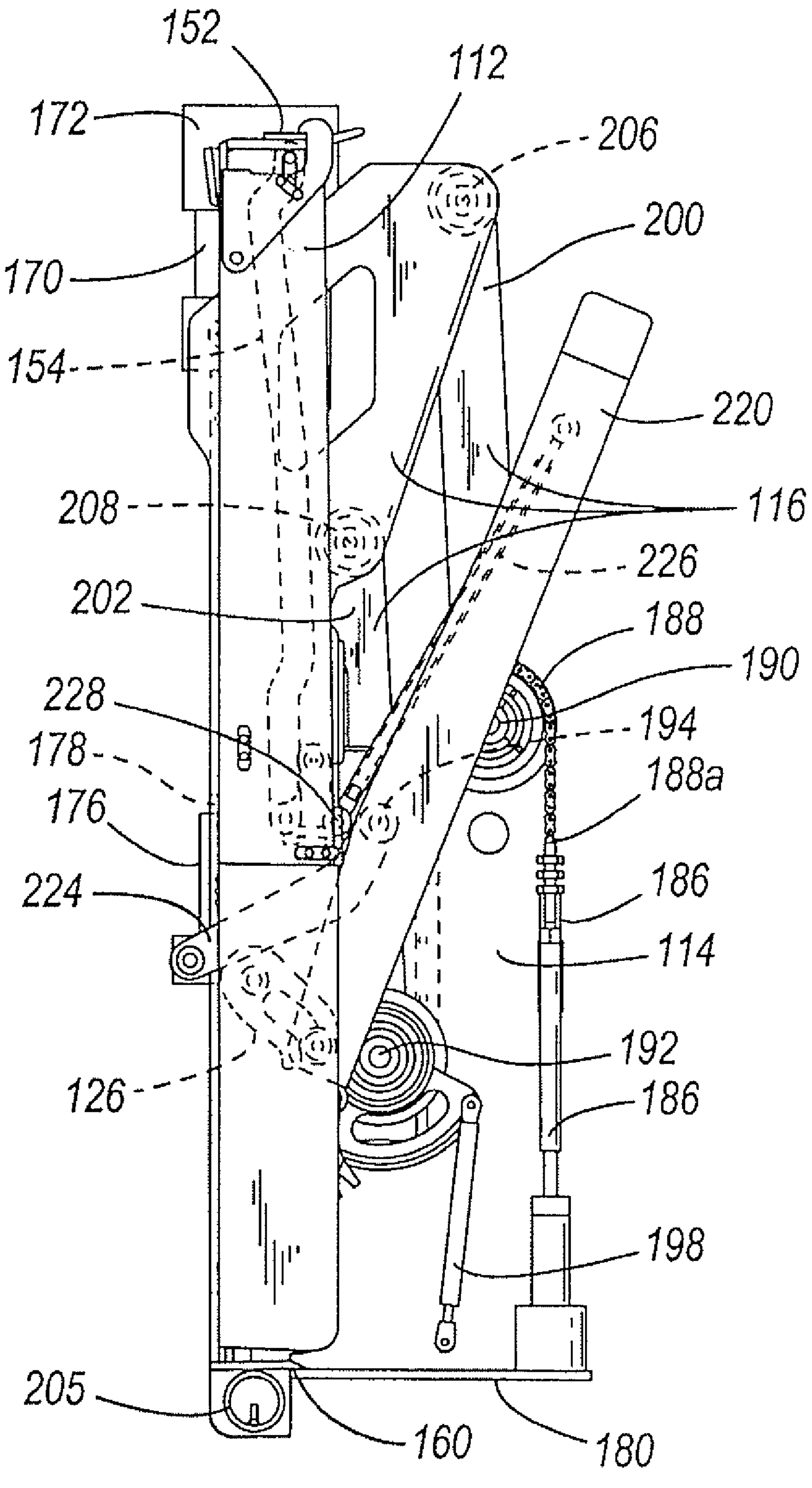
FIG. 21A is a side elevation view of the embodiment of FIG. 20 in the stowed position.
Figure 21B:
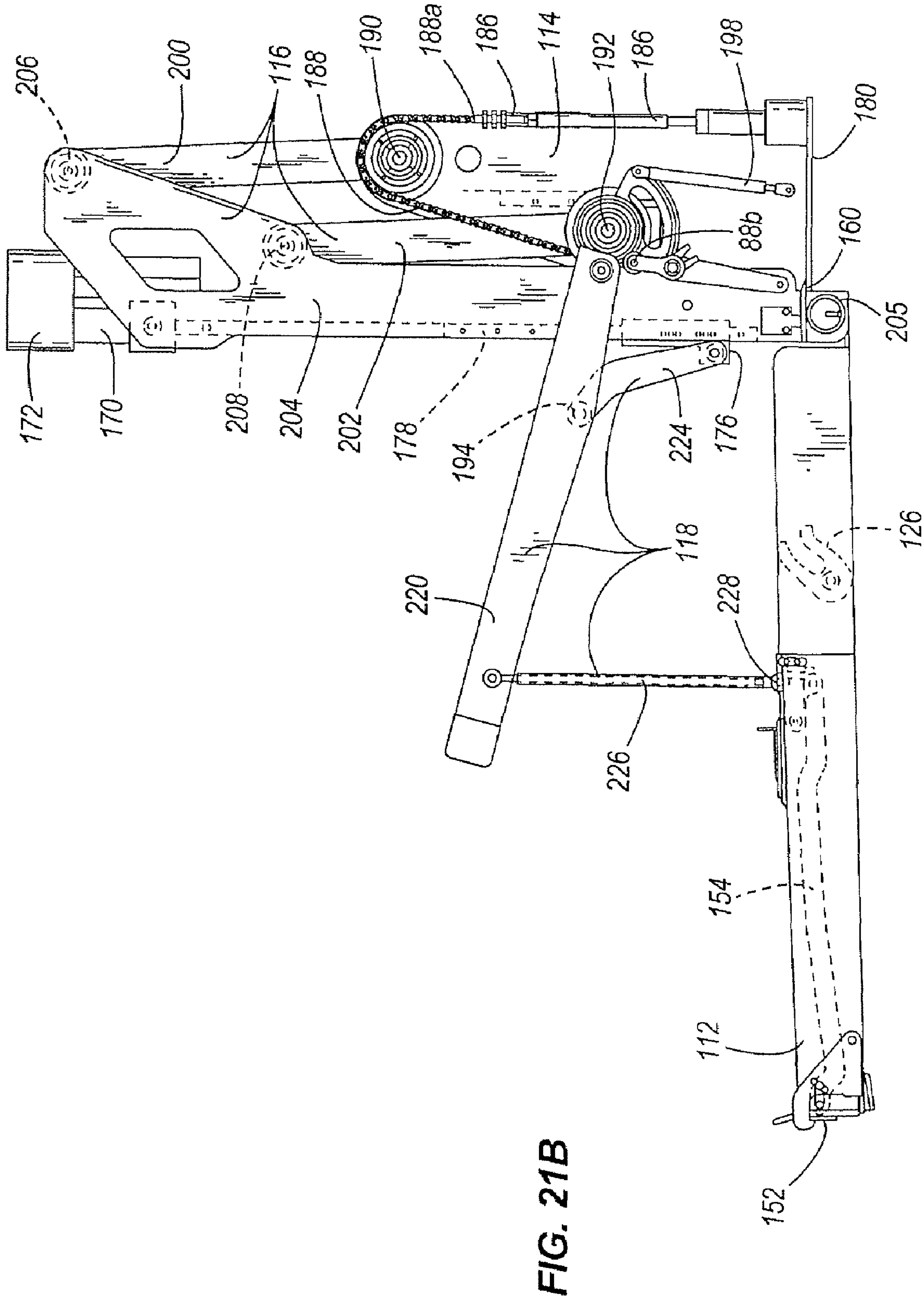
FIG. 21B is a side elevation view of the embodiment of FIG. 20 in the transfer level position.
Figure 21C:
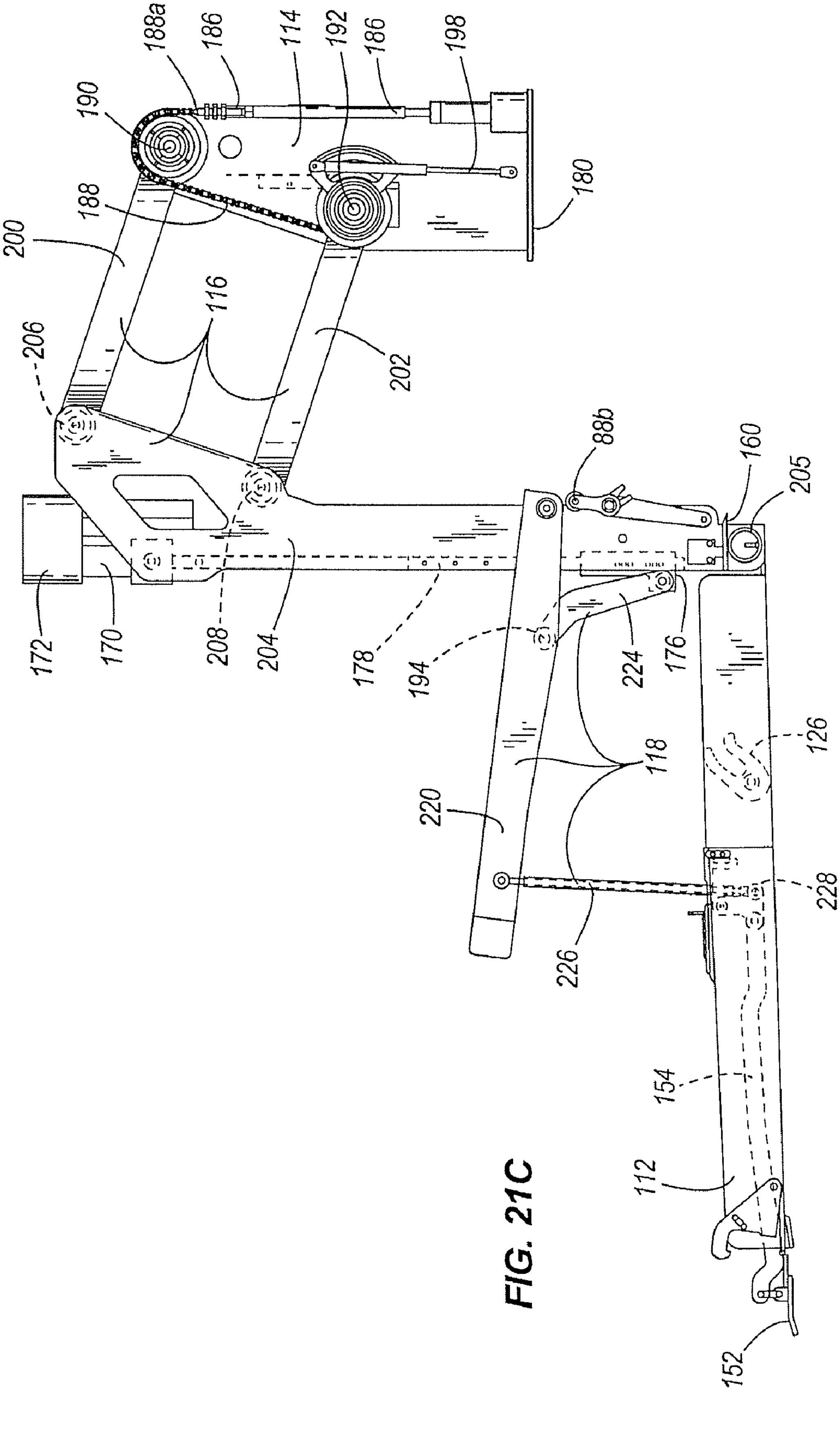
FIG. 21C is a side elevation view of the embodiment of FIG. 20 in the deployed ground level position
Figure 22:
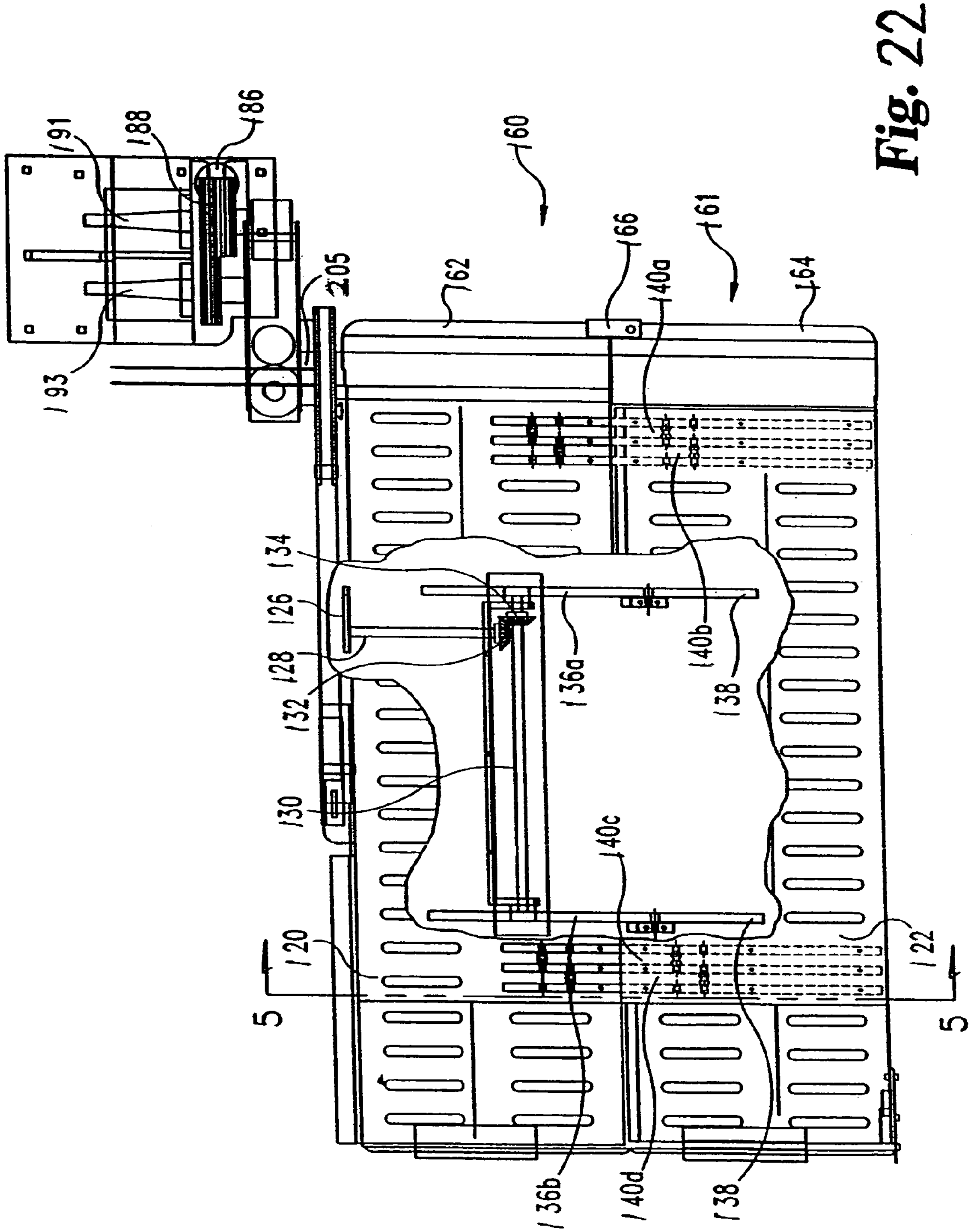
FIG. 22 is a top plan view of the embodiment of FIG. 20, with a surface removed to show internal features.

FIGS. 20-22 illustrate an alternate embodiment of a platform lifting assembly 100 adapted to move an object, such as a wheelchair. The platform lifting assembly 100 includes a segmented platform 112, a stationary support structure 114, a lifting assembly 116 and an actuator assembly 118. The segmented platform 112 includes a first platform portion or section 120 and a second platform portion or section 122, but alternative embodiments may include a plurality of platform segments numbering more than two. The platform sections 120 and 122 are preferably flat, rectangular members, but may have any convenient shape. First and second platform sections 120 and 122 abut to define an edge line 123. As shown in FIGS. 20-22, first and second platform sections 120 and 122 are arranged adjacent one another along edgeline 123, and lie generally in a single plane when deployed. It is preferred that the platform 112 be constructed from a lightweight structural material, such as aluminum or perforated steel, but any convenient structural material may be chosen.

The stationary support structure 114 includes a plate 180 adapted to be secured to a base surface, such as the floor of a vehicle such as a van, minivan, or bus. A housing 182 is secured to the base 180. Housing 182 statically secures a pair of tapered roller bearing supports 191 and 193, as best seen in FIGS. 20 and 22. Upper tapered roller bearing 191 rotatably supports a grooved upper pulley 190, and lower tapered roller bearing 193 rotatably supports a grooved lower pulley 192.

An upper lifting arm 200 and a lower lifting arm 202 are pivotally connected to upper and lower pulleys 190 and 192, respectively, in a parallel arm arrangement. Preferably, arm 200 and arm 202 are of substantially equally length as measured between pivot axes. Upper and lower lifting arms 200, 202 are also connected to platform lifting arm 204 at upper pivoting connector 206 and lower pivoting connector 208, respectively. As can be best seen in FIGS. 21A-C, arms 200, 202, 204, and stationary structure 114 (between pulleys 190 and 192) form a parallelogram four-bar linkage which maintains arm 204 in a predetermined orientation as arm 204 translates from a raised position as shown in FIG. 21B, to a lowered position, where platform 112 is at ground level as shown in FIG. 21C. Platform lifting arm 204 is pivotally connected to platform 112, preferably via pivoting shaft 205 at proximal end 161 of platform 112. Rotation of the pulleys 190 and 192 by the motion of the flexible connector 188 pivots the lifting arms 200, 202, moving platform 112 motion between the vehicle floor as shown in FIG. 21B and ground level as shown in FIG. 21C. Extending the piston 186 operates to lower the platform 112 while retracting the piston 186 operates to raise the platform 112.

One end of an actuator 186 is attached to a flexible connector 188, such as a chain or cable. In one exemplary embodiment, actuator 186 is a hydraulic cylinder with a piston movable therein between an extended position and a retracted position. One end of flexible connector 188 extends from actuator 186 and engages pulleys 190 and 192. If flexible connector 188 is a cable, the pulleys 190 and 192 are grooved or otherwise adapted to tractionally engage the cable; if the flexible connector 188 is a chain, the pulleys 190 and 192 are teethed as sprockets to tractionally engage the chain.

Movement of linear actuator 186 changes the tension in the flexible connector 188, and also moves connector 188 over the pulleys 190 and 192. Movement of the connector 188 rotates pulleys 190 and 192. As linear actuator 186 moves to a retracted position, the end of actuator 186 pulls flexible connector 188, the other end of which is connected to a point along the periphery of pulley 192. This tension in flexible connector 188 thus causes pulley 192, and lower lifting arm 202 to which it is connected, to move toward an upright, raised position as best seen in FIG. 21. Because connector 188 is wrapped around and engages a portion of the periphery of pulley 190, which is attached to upper lifting arm 200, arm 200 is also moved toward an upright position. Referring to FIGS. 21A-C, a biasing member 198 such as a gas spring is placed in compression when platform lifting arm 204 is in the upright position and platform 112 is at the level of the floor of the vehicle. In this manner, biasing member 198 maintains tension within flexible connector 188. When actuator 186 lowers platform 112 to ground level, biasing member 198 urges pulley 192 to rotate in a direction to lower platform 112.

The lifting/lowering operations are thus actuated by the piston 186, which in turn moves flexible connector 188 over the pulleys 190 and 192. Substantially constant torque is applied to platform lifting arm 204 and the platform 112 during the raising/lowering operations. As platform lifting arm 204 lowers and raises platform 112, pivoting shaft 205 is adapted to keep platform 112 substantially horizontally. The piston 186 is preferably hydraulically actuated, but may be actuated by any convenient means known in the art capable of providing sufficient power to lift the platform 112 along with a load of at least about 400 pounds.

Lifting assembly 116 includes a linear actuator motor assembly 170 coupled thereto. The linear actuator motor assembly 170 includes a motor 172 mounted to the lifting assembly, a lead screw 174 extending from the motor and threadedly engaging a threaded sled 176 slidingly mounted in a set of tracks 178 that are fixedly connected to the lifting assembly. The lead screw 174 is rotationally coupled to and actuated by the motor 172. Rotation of the screw 174 actuates the sliding movement of sled 176 in the tracks 178. In the exemplary illustrated embodiment, the linear actuator motor assembly 170 is coupled to the outer front portion of platform lifting arm 204.

Figure 23:
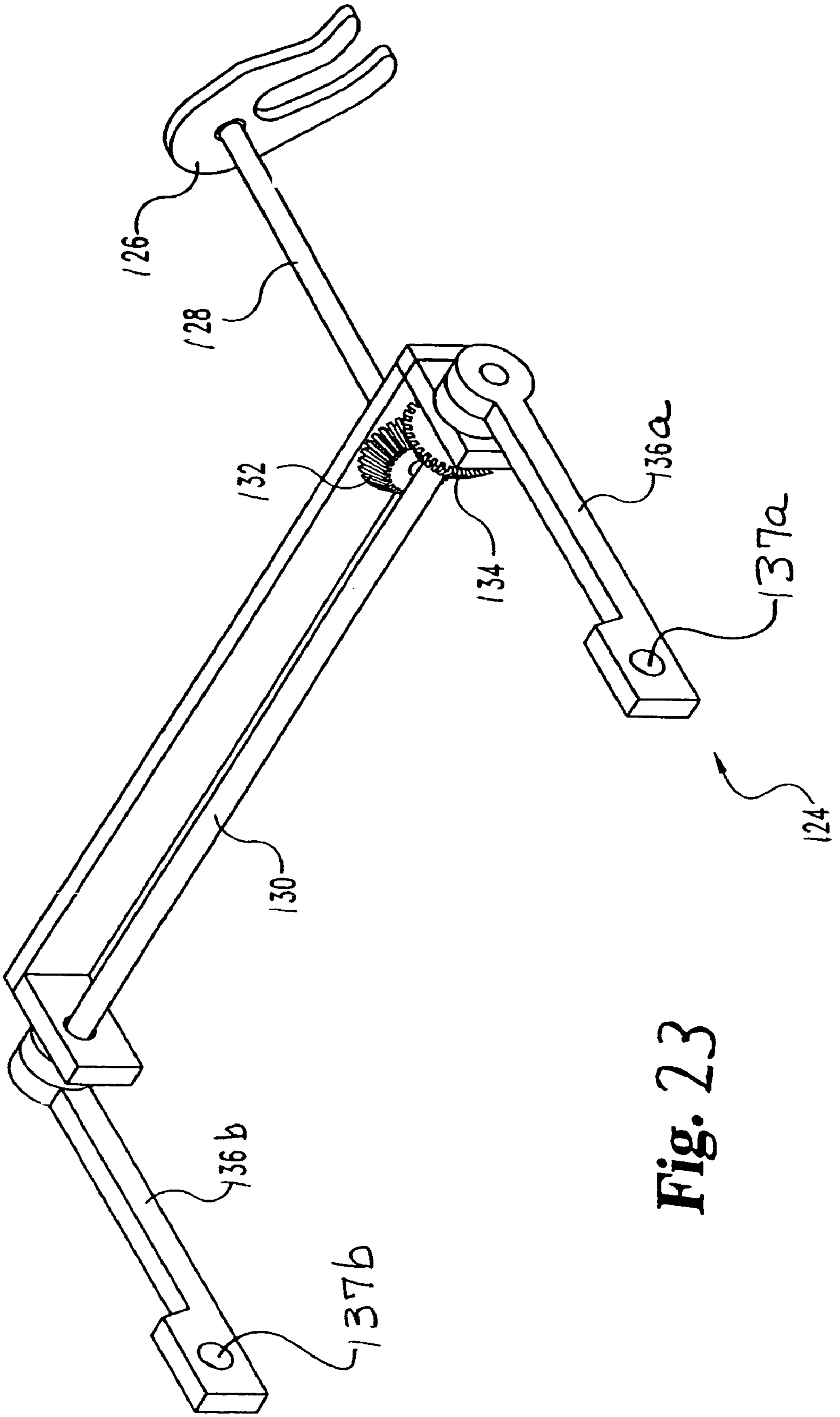
FIG. 23 is a perspective view of the gear system of the embodiment of FIG. 20.
Figure 24:
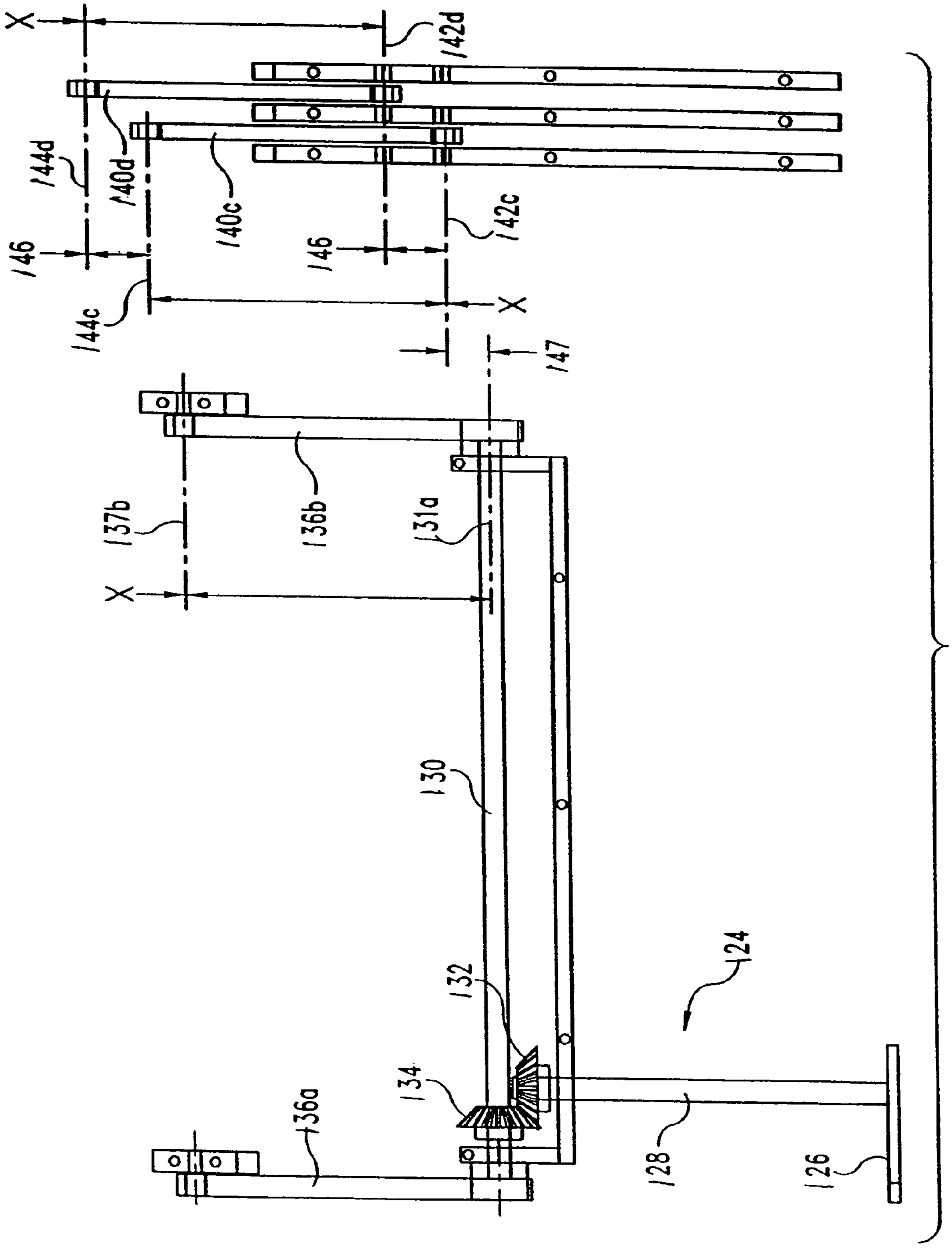
FIG. 24 is a partial top plan view of the gear system of FIG. 23, and also including a top plan view of the corresponding links.

In another embodiment, as illustrated in detail in FIGS. 22, 23 and 24, platform 112 includes a gear set 124 beneath the platform sections 120 and 122 for moving sections 120 and 122 from a deployed position to a stored position. Gear set 124 includes a cam follower 126 attached to a gear shaft 128 which is rotatably supported by platform section 120. A bevel gear 132 is connected to one end of gearshaft 128. First and second gears 132, 134 are preferably bevel gears, although the present invention contemplates other configurations of gear sets. Second gear shaft 130 preferably extends parallel to edge line 123. At least one retracting member 136*a* extends from one end of second gear shaft 130 and is pivotally coupled at 137*a* to second platform section 122. A second retracting member 136*b* extends from the other end of second shaft 130 and is pivotally coupled to second platform section 122 at pivotal coupling 137*b*. First platform section 120 also includes a retraction guide 138 for each retracting member 136 connected to second gear shaft 130. There are preferably two retracting members 136*a* and 136*b* operationally connecting the second shaft 130 to the second platform section 122, each having a corresponding retraction guide 138. The retraction guides 138 are preferably slots formed in the first platform member 120 and adapted to allow the corresponding retraction members 136*a* and 136*b* freedom of movement when stowing the platform members 120 and 122, as shown in FIGS. 25*a-d*. A cam 194 is attached to the support structure 114 and is adapted to engage cam follower 126 when the platform 112 is moved to a stowed position.

Also coupling platform section 120 to platform section 122 are a plurality of pivoting links 140*a*, 140*b*, 140*c*, and 140*d*. Referring to FIGS. 20, 22 and 24, each link 140 is pivotally coupled at a first end to platform section 120, and pivotally coupled at a second end to platform section 122. The operation of links 140*c* and 140*d* and member 136*b* will now be described. It is understood that links 140*a* and 140*b* and member 136*a* operate in similar fashion. The linkage system connects the first and second platform sections and moves them relative to each other so that they at least partially overlap in the stowed position.

Referring to FIG. 24, links 140*c* and 140*d* are arranged substantially parallel to each other, and also parallel to members 136*a* and 136*b*. Retracting member 136*b* pivots about axis 131*a* of shaft 130 and about axis 137*b* where member 136*b* is coupled to section 122. Link 140*c* is pivotally coupled to platform section 120 about axis 142*c* at one end, and at the other end is pivotally coupled to platform section 122 about axis 144*c*. Link 140*d* is pivotally coupled at one end to section 120 about axis 142*d*, and is pivotally coupled to section 122 at the other end about axis 144*d*. In one embodiment, axes 131*a*, 137*b*, 142*c*, 142*d*, 144*c*, and 144*d* are all substantially parallel. Preferably, the pivot axes of link 140*c* are offset from the pivot axes of link 140*d* in the plane of platform 112 by a distance 146. Further, the pivotal axis 131*a* of member 136*b* is spaced apart a distance 147 from pivot axis 142*c* of link 140*c*. In yet another embodiment, the length of each link 140*c* and 140*d* as measured between pivot axes is the same (labeled "X" in FIG. 24), as is the length between pivot axes 131*a* and 137*b* of link 136*b*. This combination of parallel, equal length pivoting links and members provides a plurality of parallelogram-type four-bar linkages connecting platform sections 120 and 122. As is well known for such linkages, the parallel relationship between sections 120 and 122 is maintained as the sections pivot relative to each other.

Movement of platform sections 120 and 122 from the deployed position to the stored position will now be explained. Movement of the sled 176 along tracks 178 transmits force through support member 224 and pivots actuator arm 220 about an axis coincident with the axes of bearing 193. Pivoting of arm 220 rotates platform 112 about shaft 205 between a raised, substantially vertical stowed position and a lowered, substantially horizontal deployed position. The platform 112 is raised to the stowed position by pivoting the actuator arm 220 upward and is lowered by pivoting the actuator arm 220 downward. As the platform 112 is pivoted into the raised, stowed position, cam follower 126 engages cam 194 on upper end of arm 224. Engagement of the cam follower 126 by the cam 194 during the platform-raising operation causes the cam follower 126, and shaft 128 to which it is attached, to rotate in a first direction.

Figure 25A:
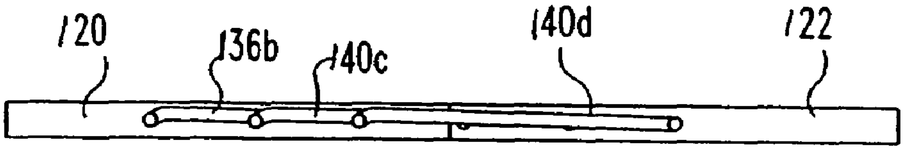
FIG. 25*a* is a partial end elevational view as taken along line 25-25 of FIG. 22, showing a portion of the platform in the deployed position.
Figure 25B:
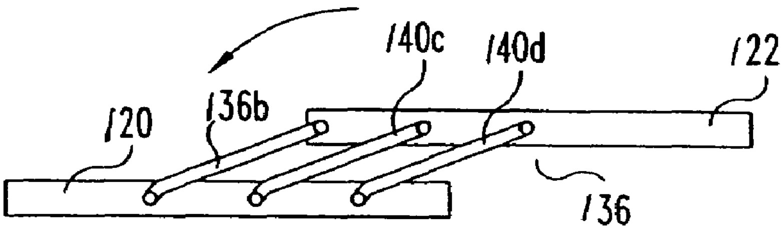
FIG. 25*b* is a partial end elevational view as taken along line 25-25 of FIG. 22, showing one platform section articulating toward the other platform section.
Figure 25C:
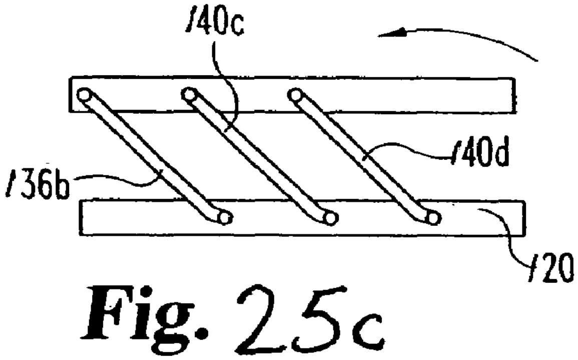
FIG. 25*c* is a partial end elevational view as taken along line 25-25 of FIG. 22, showing one platform section articulating toward the other platform section.
Figure 25D:
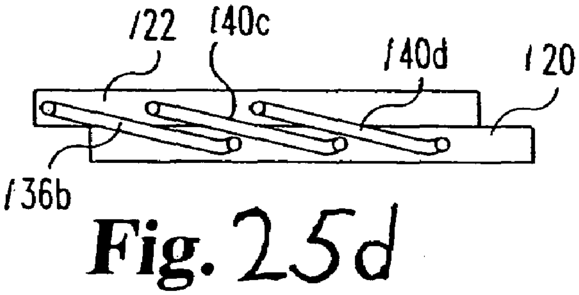
FIG. 25*d* is a partial end elevational view as taken along line 25-25 of FIG. 22, with one platform section nested adjacent to the other platform section.

Referring to FIGS. 22, 23 and 24 and 25*a-d*, the effects of actuation of the cam follower 126 are illustrated. Rotation of cam follower 126 causes rotation of shaft 128, which in turn rotates the coupled gears 132, 134. Rotation of gear 134 results in rotation of shaft 130 to which it is connected. Since each end of shaft 130 is attached to retracting members 136*a* and 136*b*, the retracting members pivot about axis 131*a* in FIG. 24. As best seen in FIGS. 25*a-d*, continued rotation of cam follower 126 by cam 194 causes platform section 122 to raise up and over platform section 120, as seen in FIGS. 25*b* and 25*c*, until it becomes nested on top of (i.e., overlapping) platform section 120, as seen in FIG. 25*d*. The parallelogram 4-bar linkages maintain a parallel relationship between platform sections 120 and 122 as they move from the deployed and coplanar position of FIG. 25*a* to the stowed, overlapping position of FIG. 25*d*.

Likewise, pivoting platform 112 from the raised stowed position to the lowered deployed position causes a rotation of the cam follower 126 in a second, opposite direction, thereby oppositely rotating the gear shafts 128, 130, the gears 132, 134, and the retracting members 136*a* and 136*b*, causing the second platform member 122 to pivot from its stowed position overlapping platform section 120 to its deployed position, where it is coplanar and adjacent first platform section 120.

Support member 224 is pivotally connected between sled 176 and actuating arm 220, operationally coupling them. Extension arm 226 is pivotally connected to actuator arm 220 and extends to pivotally connect to platform 112. Preferably, extension arm 226 connects to platform 112 at pivotal connection 228, which is also connected to the distal rollstop arm 154.

Figure 26:
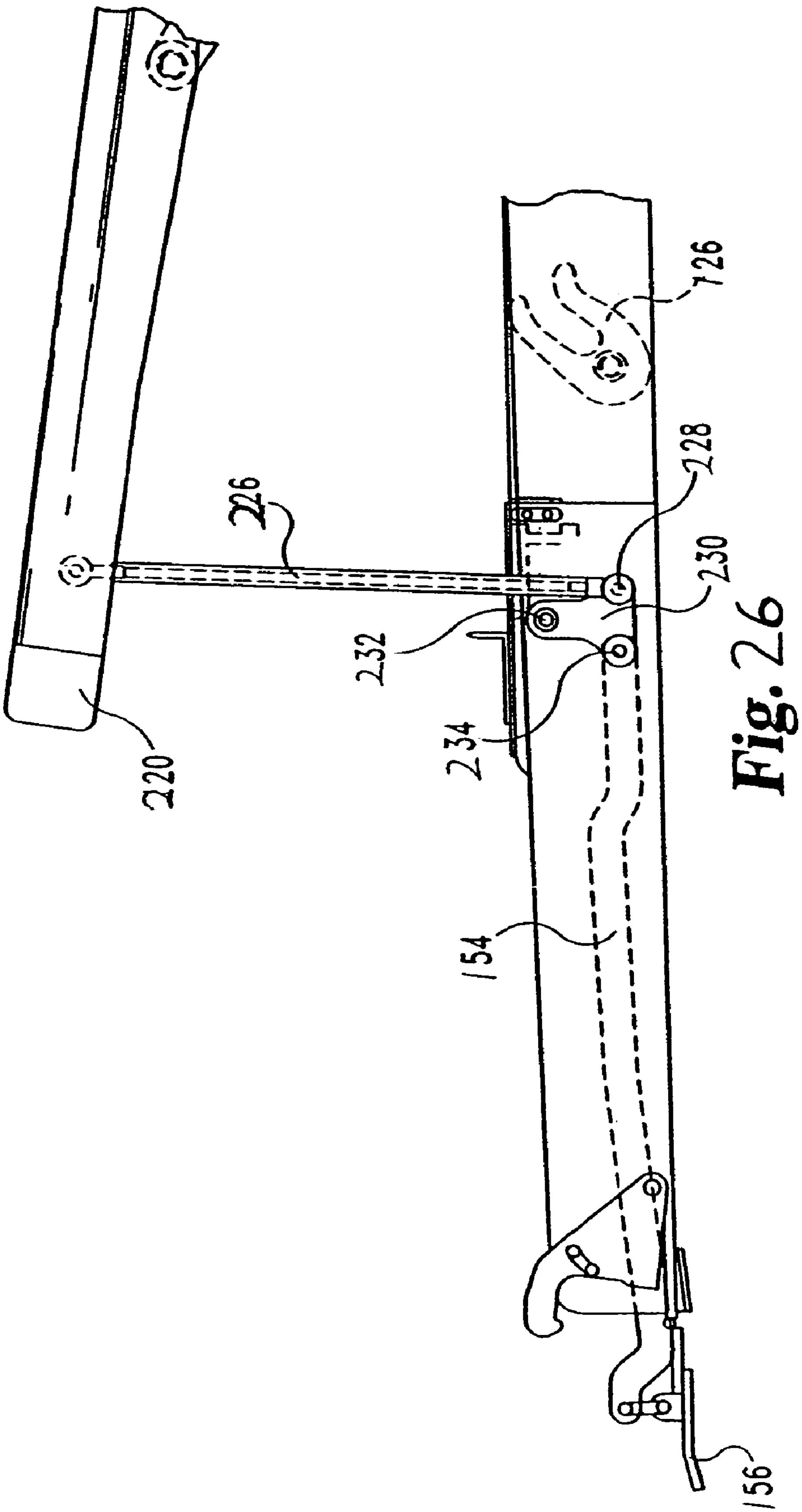
FIG. 26 is a side elevational view of a portion of the embodiment of FIG. 21 with the rollstop moved to the lowered position.

In yet another embodiment, platform 112 includes a rollstop 152 pivotally coupled to the distal end 153 of platform 112. A rollstop arm 154 is pivotally coupled at one end to the distal rollstop 152, and at the other end to a pivotal member 230 (as best seen in FIG. 26), extending along one side of platform 112. The distal rollstop 152 is movable between a first raised position and a second lowered position in which the rollstop 152 permits movement of a wheelchair onto and off the platform section 112. The distal rollstop 152 is preferably a barrier comprised of two separate sections, a first rollstop section 156 pivotally connected to the first platform section 120 and a second rollstop section 158 pivotally connected to the second platform section 122. The first rollstop section 156 preferably includes a rollstop tab 159 that extends to engagably overlap the second rollstop section 158. Referring to FIGS. 20 and 21, rollstop 152 is shown in a first, raised position which prevents removal of the wheelchair from platform 112.

Once platform 112 is deployed and lowered to ground level, distal rollstop 152 may be lowered by pivoting actuator arm 220 forward. As best seen in FIG. 26, a pivotal member 230 is pivotally coupled to a side of platform section 120. Pivotal member 230 is also pivotally coupled to arm 226 at pivotal connection 228 and to arm 154 at pivotal coupling 234. By comparing FIGS. 20 and 26, it can be seen that downward motion of arm 220 acts through arm 226 to rotate pivotal member 230 about pivotal coupling 232. This rotational motion results in a forward extension of arm 154. Pivoting the actuator arm 220 downward thus transmits a translational force to distal rollstop 152 via the coaction of pivotal member 230 and distal rollstop arm 154 (connecting the extension arm 226 to distal rollstop 152) that pivots distal rollstop 152 into its lowered, bridging position. Upward pivoting of extension arm 226 acts to pivot distal rollstop 152 into its raised, barrier orientation. The actuator arm 220 moves in response to the position of the platform to move the rollstop between the first raised position and second lowered position. As above, actuator arm 220 pivots generally forward to extend and lower first distal rollstop section 156, and actuator arm 220 pivots generally backward to retract and raise first distal rollstop section 156 into its barrier orientation. In one embodiment, second distal rollstop section 158 is pivotally connected to second platform section 122 and is biased to extend forward. Tab 159 extending across the front of second distal rollstop section 158, such that retraction of first distal rollstop section 156 also retracts second distal rollstop section 158.

A rollstop 160 is pivotally coupled to the proximal end 161 of platform 112. The proximal rollstop 160 may comprise a single rollstop section (not shown) pivotally coupled to one of the platform sections 120 and 122 or a first rollstop section 162 pivotally coupled to the first platform section 120 and a second rollstop section 164 pivotally coupled to the second platform section 122. The proximal rollstop 160 may be biased such that it pivots to lowered bridging position that is coplanar with the platform 112. The proximal rollstop may also include a rollstop tab 166 preferably connected to the first rollstop section 162 and extending to engagably overlap the second rollstop section 164. The proximal rollstop 160 is preferably adapted to pivot into raised barrier position that is perpendicular to the platform 112 when the platform 112 moves between ground level and the level of the vehicle floor. The proximal rollstop 160 may be actuated to pivot by any convenient means known in the art, such as through a rollstop arm (similar to arm 154 described above) operationally coupled thereto, or the like.

The support structure 112 may be made of a material such as aluminum, steel, or plastic. In one embodiment various lifting arms 200, 202, 204, 220 and the connecting and support members 136, 154, 180, 224, 226 are made of a stronger material, such as steel. While the invention has been illustrated and described in detail in the drawings and foregoing description, the same is to be considered as illustrative and not restrictive in character, it being understood that various exemplary embodiments have been shown and described and that all changes and modifications thereto that come within the spirit of the invention are desired to be protected.

While the present invention has been illustrated by a description of various embodiments and while these embodiments have been set forth in considerable detail, it is intended that the scope of the invention be defined by the appended claims. It will be appreciated by those skilled in the art that modifications to the foregoing preferred embodiments may be made in various aspects. It is deemed that the spirit and scope of the invention encompass such variations to be preferred embodiments as would be apparent to one of ordinary skill in the art and familiar with the teachings of the present application.

The invention claimed is:

1. A wheelchair lift comprising:
- a platform comprising first and second sections, wherein the first and second sections are substantially coplanar in a deployed position and at least partially overlap in a stowed position;
- an actuator coupled to the platform for moving the platform between the deployed and stowed positions; and
- a linkage coupled to the second platform section for moving the second section between the stowed and deployed positions, wherein the second section has an outboard end adapted to move substantially linearly between the stowed and deployed positions.

2. The wheelchair lift of claim 1, wherein the linkage extends between the actuator and the second platform section, the linkage moving the second platform section between the stowed and deployed positions in response to movement of the actuator.

3. The wheelchair lift of claim 1, wherein one of the first and second platform sections is approximately 67% of the length of the platform.

4. The wheelchair lift of claim 3, wherein the second platform section is 67% of the length of the platform.

5. The wheelchair lift of claim 1, further comprising side barriers coupled to the platform sections, wherein the side barriers of the second platform section telescope inboardly and outboardly relative to the side barriers of the first platform section.

6. A wheelchair lift comprising:
- a platform for supporting a wheelchair;
- a vertical arm to move the platform;
- an actuator for moving the vertical arm between outboard and inboard positions relative to the actuator;
- an elongated support coupled to the vertical arm and the platform;
- a first platform section coupled to the elongated support;
- a second platform section coupled to the elongated support for movement relative to the first platform section; and
- a linkage connected to the second platform section for moving the second platform section relative to the first platform section in response to the position of the platform, wherein the second platform section moves substantially linearly between a stowed position with respect to the first platform section when the vertical arm is in the inboard position and a deployed position with respect to the first platform section when the vertical arm is in an outboard position.

7. A wheelchair lift as recited in claim 6, wherein the linkage comprises a gear assembly.

8. A wheelchair lift as recited in claim 7, wherein the linkage comprises a rack gear and a pinion arm.

9. An apparatus for a wheelchair lift comprising:
- a platform for supporting a wheelchair;
- a platform lifting arm attached to the platform and moveable between a first position and a second position;
- an actuator coupled to a stationary structure;
- a first arm pivotally coupled at a first end to the stationary structure and pivotally coupled at a second end to the platform lifting arm; and
- a connector coupled at a first end to the first arm and coupled at a second end to the actuator;
- wherein movement of the actuator moves the connector towards and away from the actuator to pivot the first arm and thereby move the platform lifting arm between the first and second positions.

10. An apparatus as recited in claim 9, wherein in the first position the platform is substantially horizontal at a first elevation and in the second position the platform is substantially horizontal at a second elevation different from the first elevation.

11. An apparatus as recited in claim 9, wherein the actuator is hydraulic.

12. An apparatus as recited in claim 9, wherein the actuator is linear.

13. An apparatus as recited in claim 9, further comprising a second arm pivotally coupled at a first end to the stationary structure and pivotally coupled at a second end to the platform lifting arm, with the connector being coupled to the first end of the second arm.

14. An apparatus as recited in claim 13, wherein the first and second arms form a parallelogram with the platform lifting arm.

15. An apparatus as recited in claim 9, wherein the connector is coupled to a pulley at the first end of the first arm.

16. An apparatus as recited in claim 15, wherein the connector is coupled to a pulley at the first end of the second arm.

17. A wheelchair lift comprising:
- a platform for supporting a wheelchair;
- a lift arm connected to the platform to move the platform between a first and a second position;

an actuator for moving the lift arm;

a pulley coupled to the lift arm; and a connector coupled to the actuator and movable towards and away from the actuator to turn the pulley.

18. An apparatus as recited in claim 17, wherein the drive is linear.

19. An apparatus as recited in claim 17, further comprising a second arm coupled at a first end to the pulley and at a second end to the lift arm.

* * * * *